US010204501B2

(12) United States Patent
Chong et al.

(10) Patent No.: US 10,204,501 B2
(45) Date of Patent: *Feb. 12, 2019

(54) PROVIDING PREDICTIVE ALERTS FOR WORKPLACE SAFETY

(71) Applicant: Accenture Global Solutions Limited, Dublin (IE)

(72) Inventors: James Wei Weng Chong, Singapore (SG); Hanny Kusumawardhani, Singapore (SG); Ramdan Bin Mohd Pawi, Singapore (SG); Yevgeniy Kim, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,811

(22) Filed: Jan. 26, 2018

(65) Prior Publication Data

US 2018/0151049 A1   May 31, 2018

Related U.S. Application Data

(63) Continuation of application No. 15/220,942, filed on Jul. 27, 2016, now Pat. No. 9,905,107.

(51) Int. Cl.
*G06Q 10/06* (2012.01)
*G08B 21/04* (2006.01)

(52) U.S. Cl.
CPC ..... *G08B 21/0453* (2013.01); *G06Q 10/0633* (2013.01); *G08B 21/0423* (2013.01)

(58) Field of Classification Search
CPC .............. G08B 21/0453; G06Q 10/0633
See application file for complete search history.

(56) References Cited

U.S. PATENT DOCUMENTS

| 6,765,214 | B1 * | 7/2004 | Kosslow | G01T 1/14 |
| | | | | 250/376 |
| 9,547,970 | B2 * | 1/2017 | Jobin | G08B 21/02 |
| 2007/0180140 | A1 * | 8/2007 | Welch | G06F 19/3418 |
| | | | | 709/238 |

(Continued)

FOREIGN PATENT DOCUMENTS

| JP | 2003305026 A | 10/2003 |
| WO | WO 2015/128743 A2 | 9/2015 |
| WO | WO 2016/028228 A1 | 2/2016 |

OTHER PUBLICATIONS

US 9,881,476, 01/2018, Chong et al. (withdrawn)

(Continued)

*Primary Examiner* — Joseph H Feild
*Assistant Examiner* — Rufus C Point
(74) *Attorney, Agent, or Firm* — Harrity & Harrity, LLP

(57) ABSTRACT

A device may receive one or more environmental measurements associated with a workplace. The device may receive one or more physiological measurements associated with a worker. The one or more physiological measurements may be different from the one or more environmental measurements. The device may generate a safety score for the worker based on the one or more environmental measurements and the one or more physiological measurements. The device may provide information regarding the worker based on the safety score.

20 Claims, 20 Drawing Sheets

(56) References Cited

U.S. PATENT DOCUMENTS

| | | | |
|---|---|---|---|
| 2008/0146892 A1 | 6/2008 | LeBoeuf | |
| 2008/0161701 A1* | 7/2008 | Bullens | A61B 5/0537 600/481 |
| 2008/0189142 A1 | 8/2008 | Brown et al. | |
| 2009/0040014 A1* | 2/2009 | Knopf | E04G 21/32 340/5.1 |
| 2010/0241464 A1* | 9/2010 | Amigo | G06Q 40/08 705/4 |
| 2011/0133927 A1 | 6/2011 | Humphrey et al. | |
| 2013/0063264 A1* | 3/2013 | Oktem | G05B 23/024 340/540 |
| 2014/0222521 A1 | 8/2014 | Chait | |
| 2016/0071393 A1 | 3/2016 | Kaplan et al. | |
| 2016/0106174 A1* | 4/2016 | Chung | A42B 3/0453 340/539.13 |
| 2016/0137059 A1 | 5/2016 | Mader et al. | |
| 2016/0292988 A1* | 10/2016 | McCleary | G08B 21/14 |
| 2016/0307425 A1* | 10/2016 | Jobin | G08B 21/02 |
| 2017/0022807 A1* | 1/2017 | Dursun | E21B 41/0021 |
| 2017/0117064 A1* | 4/2017 | Lepine | G21C 17/00 |
| 2017/0178050 A1* | 6/2017 | Anjomshoa | G06Q 10/063116 |

OTHER PUBLICATIONS

Extended European search report corresponding to EP 17183452.6, dated Jan. 31, 2018, 6 pages.
Accenture, "New Digital Perspectives in Aerospace and Defense," https://youtu.be/vj7_B-MOX3c?t=197, Aug 28, 2015, 2 pages.

\* cited by examiner

PROVIDING PREDICTIVE ALERTS FOR WORKPLACE SAFETY

RELATED APPLICATION

This application is a continuation of U.S. patent application Ser. No. 15/220,942, filed Jul. 27, 2016 (now U.S. Pat. No. 9,881,476), which is incorporated herein by reference.

BACKGROUND

Workplace accidents have been responsible for numerous injuries and fatalities. Additionally, workplace accidents have resulted in significant property damage. Substantial losses in productivity have also occurred as a result of worker and equipment downtime due to workplace accidents.

SUMMARY

In some implementations, a method may include receiving, by a system, one or more environmental measurements associated with a workplace. The method may include receiving, by the system, one or more physiological measurements associated with a worker. The one or more physiological measurements may be different from the one or more environmental measurements. The method may include generating, by the system, a safety score for the worker based on the one or more environmental measurements and the one or more physiological measurements. The method may include providing, by the system, an alert, regarding the worker, based on the safety score.

In some implementations, a device may include one or more environmental sensors to obtain one or more environmental measurements associated with a workplace. The device may include one or more physiological sensors to obtain one or more physiological measurements associated with a worker located in the workplace. The one or more physiological measurements may be different from the one or more environmental measurements. The device may include at least one of: a communication interface to provide the one or more environmental measurements and the one or more physiological measurements and to receive an alert based on a safety score generated using the one or more environmental measurement and the one or more physiological measurements, or one or more processors to generate the safety score based on the one or more environmental measurements and the one or more physiological measurements. The device may include an output component to output a signal based on receiving the alert or generating the safety score.

In some implementations, a non-transitory computer-readable medium may store one or more instructions that, when executed by one or more processors, cause the one or more processors to receive one or more environmental measurements associated with a workplace. The one or more instructions may cause the one or more processors to receive one or more physiological measurements associated with a worker. The one or more physiological measurements may be different from the one or more environmental measurements. The one or more instructions may cause the one or more processors to generate a safety score for the worker based on the one or more environmental measurements and the one or more physiological measurements. The one or more instructions may cause the one or more processors to provide information regarding the worker based on the safety score.

DETAILED DESCRIPTION

The following detailed description of example implementations refers to the accompanying drawings. The same reference numbers in different drawings may identify the same or similar elements.

A workplace accident may result from a confluence of factors that may be difficult to detect before the accident occurs, such as work factors associated with a workplace, environmental factors associated with a work environment, and/or physiological factors associated with a worker. Implementations described herein provide a way to analyze a variety of factors to predict a likelihood of a workplace accident. For example, information may be obtained and utilized to determine a safety score indicating a level of safety with respect to a worker, a group of workers, a workplace location, or the like. Such information may include environmental measurements associated with environmental factors, physiological measurements associated with physiological factors, and/or work information associated with work factors. In some implementations, some or all of the information may be obtained in real time from a wearable device worn by the worker. In some implementations, a likelihood of an accident may be predicted based on the safety score. In some implementations, alerts may be provided to help prevent workplace accidents based on the safety score and/or the predicted likelihood of an accident.

In this way, worker safety may be increased and workplace accidents may be reduced by using environmental measurements, physiological measurements, and/or work information to predict when workplace accidents are likely to occur and to send alerts to prevent such accidents from occurring. As a result, worker injuries and/or fatalities may be prevented, property damage may be avoided, and downtime of workers and/or equipment may be reduced.

Figure 1:
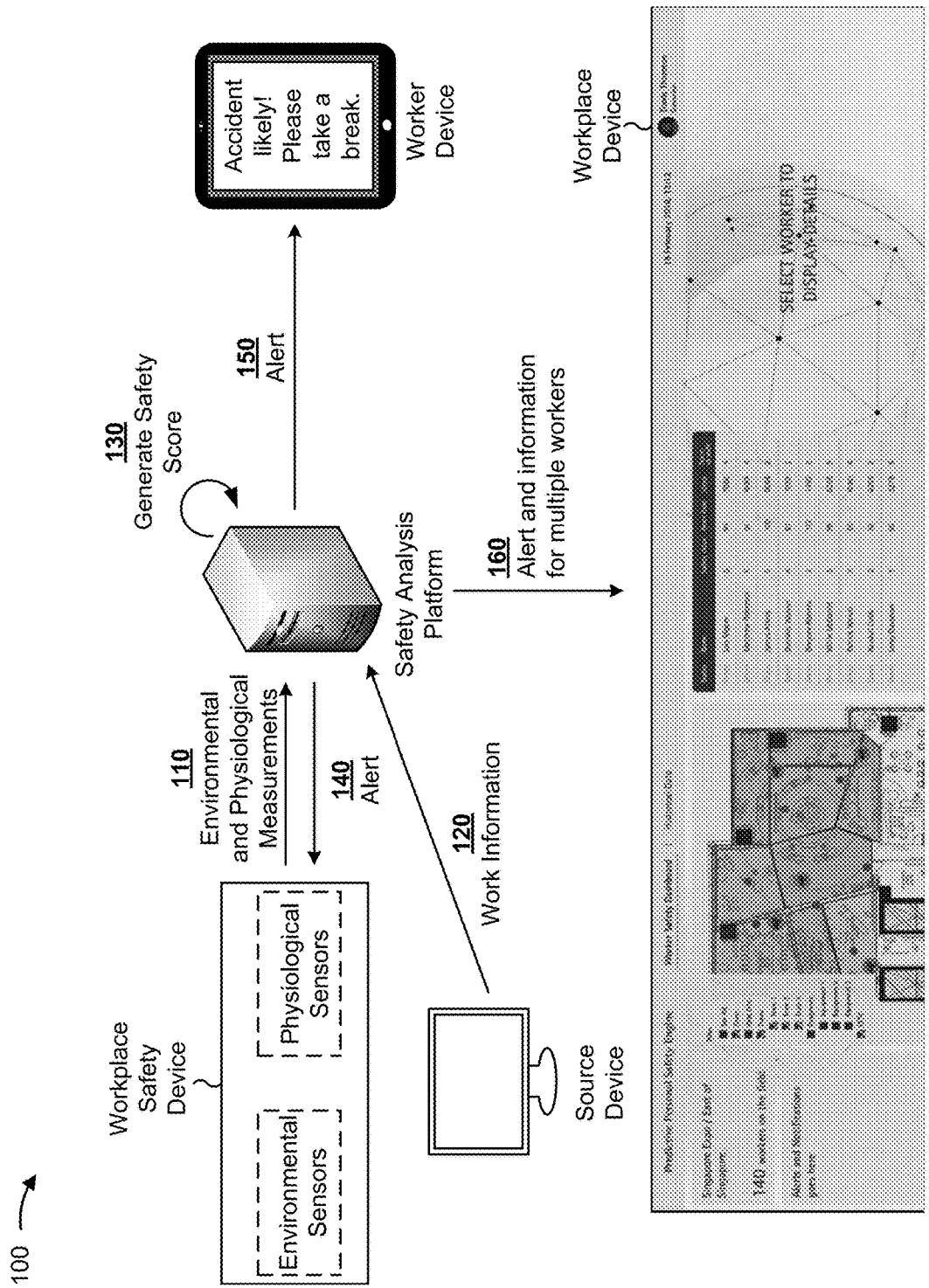
FIG. 1 is a diagram of an overview of an example implementation described herein.

FIG. 1 is a diagram of an overview of an example implementation 100 described herein. As shown in FIG. 1, example implementation 100 may include a safety analysis platform (e.g., in a cloud computing environment) that receives safety-related information, generates a safety score, and provides alerts based on the safety score. As shown by reference number 110, the safety analysis platform may receive environmental measurements and/or physiological measurements from a workplace safety device (e.g., a wearable device or another type of device) that may include environmental sensors and/or physiological sensors. The environmental measurements may be associated with an environmental condition in the work environment (e.g., carbon monoxide, smoke, or weather conditions). The physiological measurements may be associated with a physiological indicator for a worker (e.g., heart rate, glucose level, blood pressure, or skin temperature). As shown by reference number 120, the safety analysis platform may receive work information from a source device (e.g., a computer that stores work history information). As shown by reference number 130, the safety analysis platform may generate a safety score, which may be based on the environmental measurements, the physiological measurements, and/or the work information.

The safety analysis platform may generate safety-related alerts based on the safety score. For example, as shown by reference number 140, the safety analysis platform may provide an alert to the workplace safety device, which may cause the workplace safety device to output a visual or auditory signal, such as a light or alarm. As another example, as shown by reference number 150, the safety analysis platform may provide an alert to a worker device (e.g., a smart phone, a smart watch, a smart band, or a pair of smart eyeglasses of a worker), which may cause the worker device to display a warning message to the user, such as a prompt to take a break or an instruction to leave an area. As still another example, as shown by reference number 160, the safety analysis platform may provide an alert to a workplace device (e.g., a computer used by a supervisor), which may cause the workplace device to display safety related information for multiple workers, such as via a user interface, as shown.

By generating the safety score based on environmental, physiological, and work factors, and by providing one or more alerts based on the safety score to one or more workplace safety devices, worker devices, and/or workplace devices, the potential for workplace accidents may be predicted and recognized before they occur, and workplace accidents may be prevented. Further, computing resources may be conserved by using the safety score as a reliable indicator of worker or workplace safety and by selectively taking action based on the safety score.

As indicated above, FIG. 1 is provided merely as an example. Other examples are possible and may differ from what was described with regard to FIG. 1.

Figure 2:
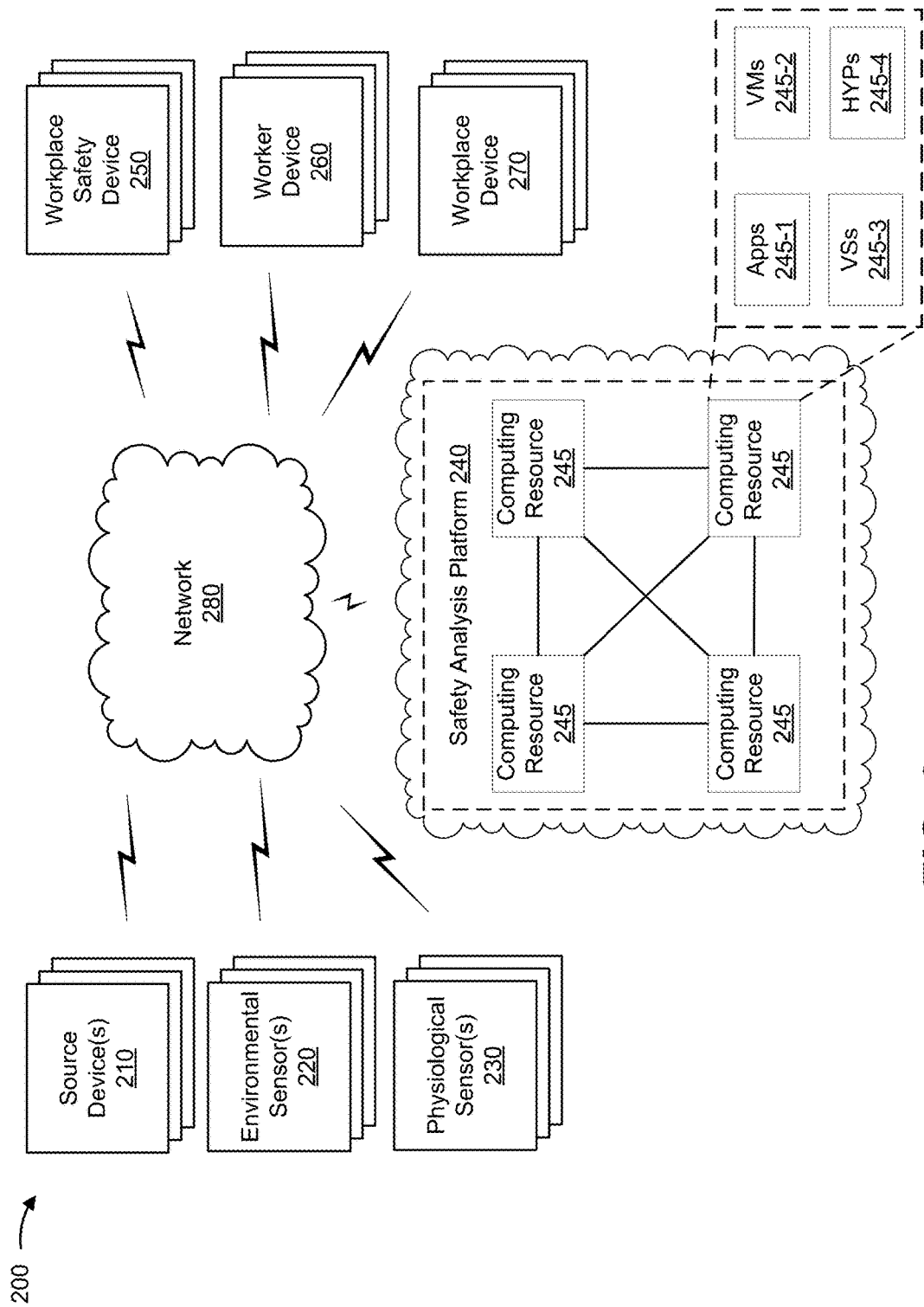
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include source device(s) 210, environmental sensor(s) 220, physiological sensor(s) 230, a safety analysis platform 240, a workplace safety device 250, a worker device 260, a workplace device 270, and a network 280. Devices of environment 200 may interconnect via wired connections, wireless connections, or a combination of wired and wireless connections.

Source device 210 includes one or more devices capable of obtaining and/or providing work information and/or external information, such as information associated with a weather forecast. For example, source device 210 may include a device that permits a worker or supervisor to input work information, such as a laptop computer, a desktop computer, a mobile device, or the like. Additionally, or alternatively, source device 210 may include a server (e.g., a web server) that stores information, such as weather information, or the like.

Environmental sensor 220 includes one or more devices capable of measuring an environmental condition associated with a workplace. For example, environmental sensor 220 may include a sensor that measures a level of a chemical substance in the surrounding environment, such as a carbon monoxide level, an oxygen level, or the like. As another example, environmental sensor 220 may include a sensor that measures a temperature level, a humidity level, a moisture level, a wind level, a smoke level, a radiation level, or the like. As yet another example, environmental sensor 220 may include a sensor that measures a speed, a velocity, an acceleration (e.g., a positive acceleration or a negative acceleration, or deceleration), an angular acceleration, a geographic location, a change in geographic location, an altitude, a force exerted on environmental sensor 220, an orientation of environmental sensor 220, a change in orientation of environmental sensor 220, or the like. As still another example, environmental sensor 220 may include a sensor that measures a time of day, an amount of light, a location of a worker in the workplace, or the like.

Physiological sensor 230 includes one or more devices capable of measuring a physiological indicator associated with a user. For example, physiological sensor 230 may include a heart rate monitor, a blood pressure sensor, a glucose monitor, a pulse monitor, or the like. As another example, physiological sensor 230 may include a microphone (e.g., to detect noises made by the worker), an accelerometer, a pedometer, a gyroscope, a heat flux sensor, a skin conductivity sensor, a temperature sensor (e.g., a skin temperature sensor, or an air temperature sensor), a calorie monitor, a sleep monitor, a motion sensor, a moisture sensor (e.g., a perspiration sensor), or the like. As yet another example, physiological sensor 230 may include a chemical sensor or chemical compound sensor to measure oxygen, carbon dioxide, lactate, testosterone, cortisol, glucose, glucagon, glycogen, insulin, starch, free fatty acid, triglycerides, monoglycerides, glycerol, pyruvate, lipids, other carbohydrates, ketone bodies, choline, or the like.

Safety analysis platform 240 includes one or more devices or systems capable of receiving information and analyzing the information to generate a safety score. For example, safety analysis platform 240 may include a server that receives data from source device 210, environmental sensor 220, and/or physiological sensor 230, and analyzes the data to generate a safety score. Safety analysis platform 240 may provide an alert, based on the safety score, to other devices. In some implementations, safety analysis platform 240 may be remote from workplace safety device 250.

Safety analysis platform 240 may be hosted by a cloud computing environment. The cloud computing environment may provide computation, software, data access, storage, etc. services that do not require end-user knowledge of a physical location and configuration of system(s) and/or device(s) that host safety analysis platform 240. As shown, the cloud computing environment may include a group of computing resources 245 (referred to collectively as "computing resources 245" and individually as "computing resource 245").

Computing resource 245 includes one or more personal computers, workstation computers, server devices, or another type of computation and/or communication device. In some implementations, computing resource 245 may host safety analysis platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, one or more virtualized storages ("VSs") 245-3, or one or more hypervisors ("HYPs") 245-4.

Application 245-1 includes one or more software applications that may be provided to or accessed by one or more devices of environment 200. Application 245-1 may eliminate a need to install and execute the software applications on devices of environment 200. For example, application 245-1 may include software associated with safety analysis platform 240 and/or any other software capable of being provided via a cloud computing environment. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., associated with one or more devices of environment 200), and may manage infrastructure of a cloud computing environment, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 may provide hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Workplace safety device 250 includes one or more devices capable of being worn or carried by a worker. For example, workplace safety device 250 may include a wearable device, such as a smart vest, smart eyeglasses, a smart wristwatch, a smart band, or the like. As another example, workplace safety device 250 may include a mobile device or another type of device. In some implementations, workplace safety device 250 may include one or more environmental sensors 220 and/or one or more physiological sensors 230.

Worker device 260 includes one or more devices associated with a worker. For example, worker device 260 may include a mobile device, such as a smart phone, a walkie-talkie, a tablet computer, a mobile personal computer, a digital assistant, a pager, a camera, a device associated with the work being performed (e.g., a device incorporated into workplace equipment), or the like.

Workplace device 270 includes one or more devices capable of receiving alerts associated with one or more workers and providing a user interface for communicating the alerts (e.g., by displaying information based on the alerts on a display screen). For example, workplace device 270 may include a laptop computer, a desktop computer, a mobile device, a computer terminal, an interactive display, a server device, or the like.

Network 280 includes one or more wired and/or wireless networks. For example, network 280 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a personal area network (PAN), a telephone network (e.g., the Public Switched Telephone Network (PSTN)), a private network, an ad hoc network, an intranet, the Internet, a fiber optic-based network, a cloud computing network, a peer-to-peer network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
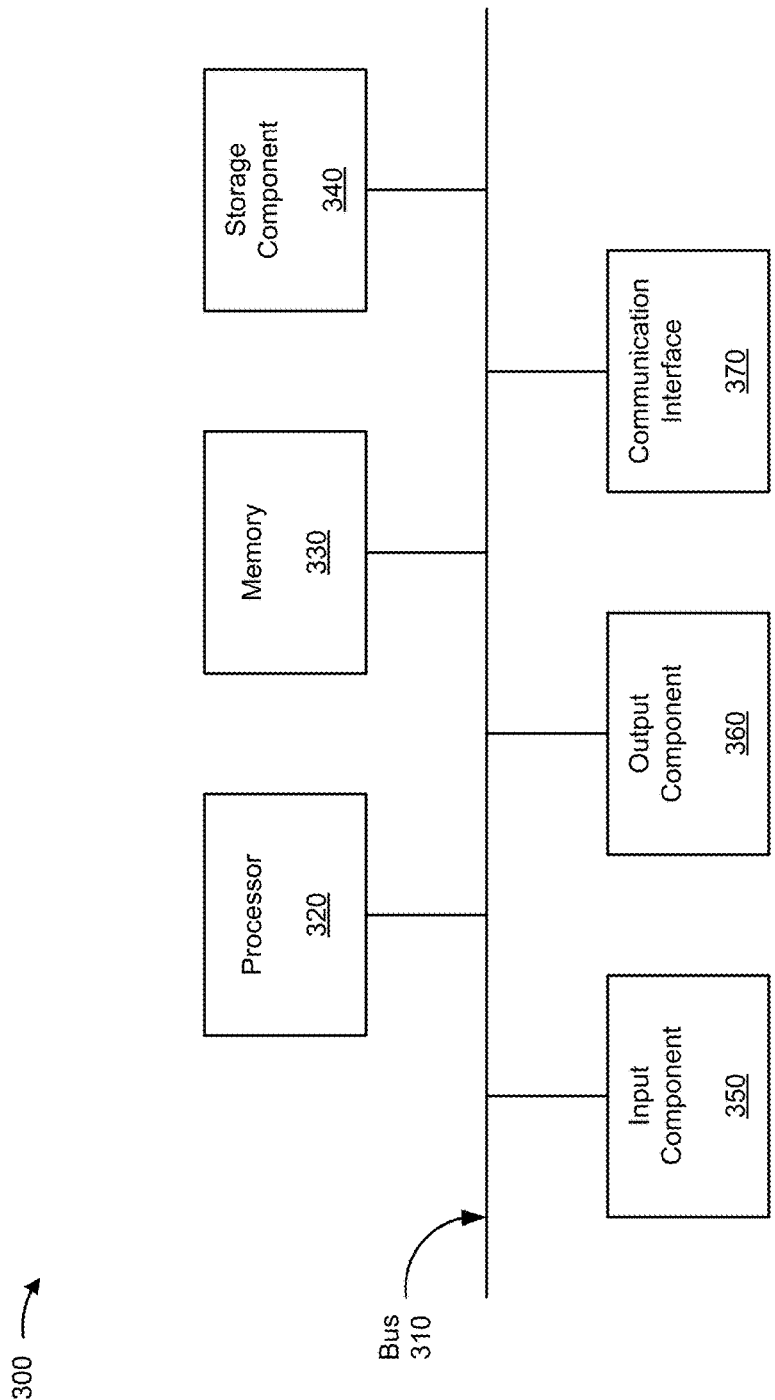
FIG. 3 is a diagram of example components of one or more devices of FIG. 2.

FIG. 3 is a diagram of example components of a device 300. Device 300 may correspond to source device 210, environmental sensor 220, physiological sensor 230, safety analysis platform 240, workplace safety device 250, worker device 260, and/or workplace device 270. In some implementations, source device 210, environmental sensor 220, physiological sensor 230, safety analysis platform 240, workplace safety device 250, worker device 260, and/or workplace device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
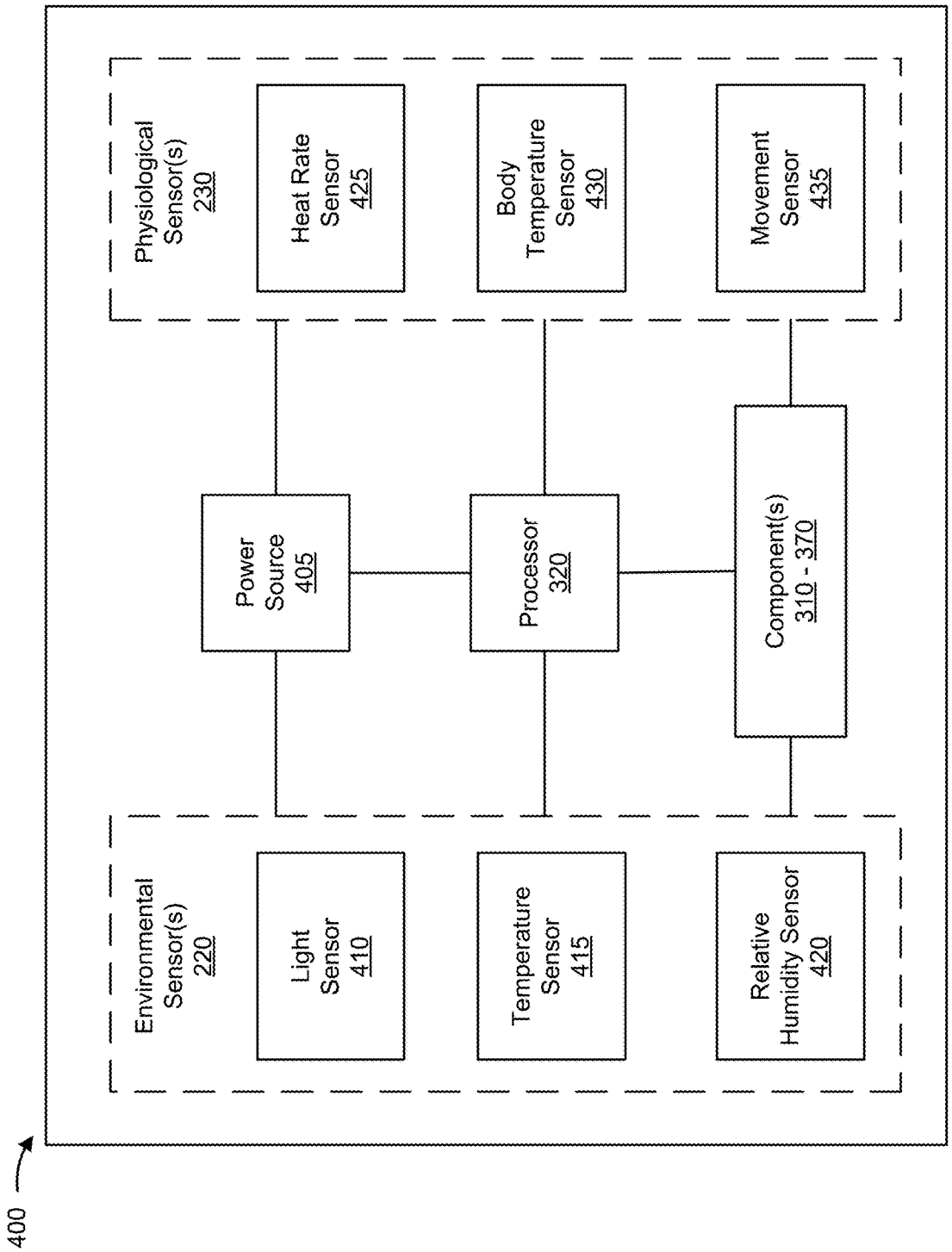
FIG. 4 is a diagram of example components of one or more devices of FIG. 2.

FIG. 4 is a diagram of example components of a device 400. In some implementations, device 400 may correspond to workplace safety device 250. In some implementations, device 400 may include a wearable device, such as a wearable smart vest, wearable smart eyeglasses, a wearable smart wristwatch, or the like. Additionally, or alternatively, workplace safety device 250 may include a mobile device, such as a smart phone. In some implementations, workplace safety device 250 may include one or more devices 400 and/or one or more components of device 400.

As shown in FIG. 4, device 400 may include one or more components shown in FIG. 3 (e.g., components 310-370). Additionally, or alternatively, device 400 may include a power source 405, such as a battery. Additionally, or alternatively, device 400 may include one or more environmental sensors 220, such as a light sensor 410, a temperature sensor 415, a relative humidity sensor 420, or the like. Additionally, or alternatively, device 400 may include one or more physiological sensors 230, such as a heart rate sensor 425, a body temperature sensor 430, a movement sensor 435, or the like.

In some implementations, device 400 may communicate with another device, such as a computing device (e.g., a laptop computer or a desktop computer, such as worker device 260 or workplace device 270), via communication interface 370, to program one or more components of device 400. In some implementations, power source 405 may be connected to an external power source for charging. In some implementations, device 400 may be capable of communicating with one or more other devices, such as one or more devices shown in environment 200 and/or one or more other devices 400. In some implementations, device 400 may communicate with other devices 400 (e.g., other workplace safety devices 250) via peer-to-peer communication.

The number and arrangement of components shown in FIG. 4 are provided as an example. In practice, device 400 may include additional components, fewer components, different components, or differently arranged components than those shown in FIG. 4. Additionally, or alternatively, a set of components of device 400 may perform one or more functions described as being performed by another set of components of device 400.

Figure 5:
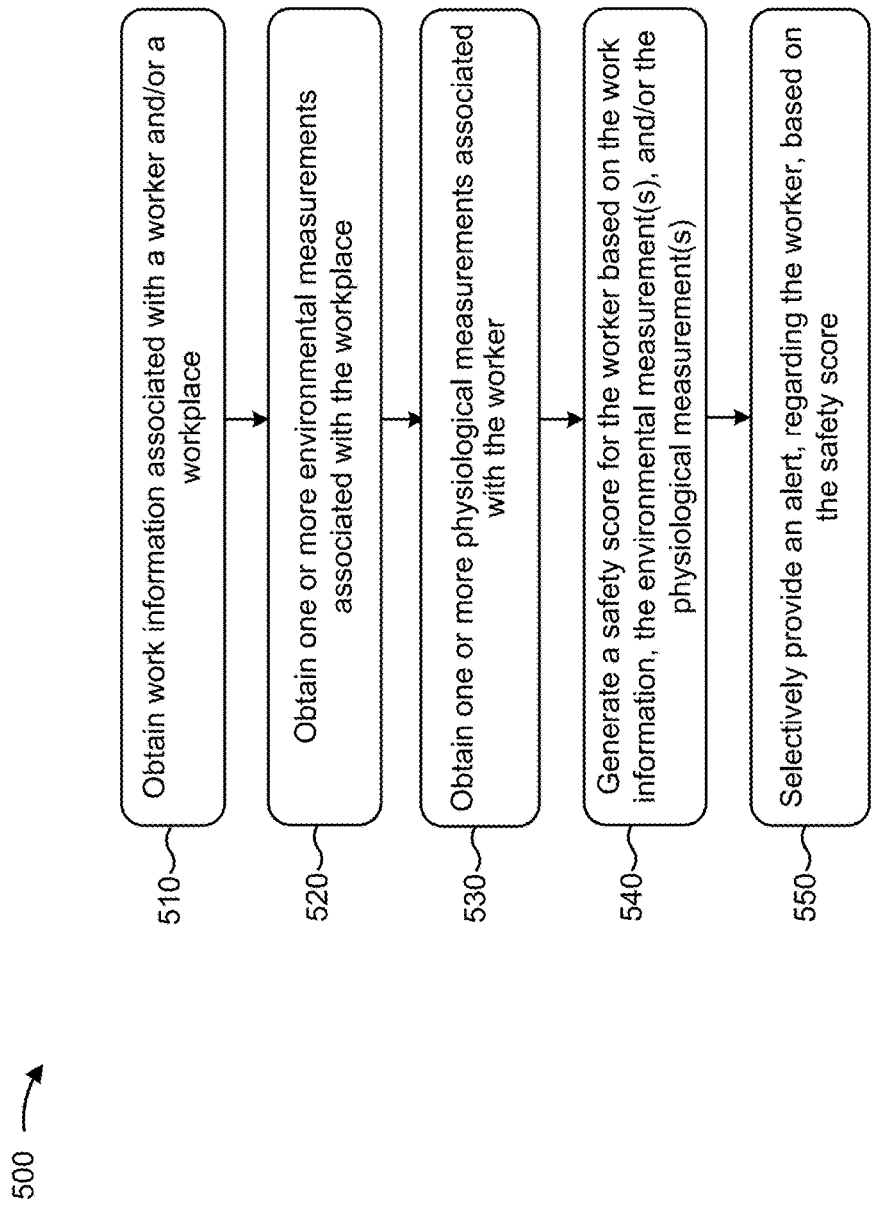
FIG. 5 is a flow chart of an example process for providing predictive alerts for workplace safety.

FIG. 5 is a flow chart of an example process 500 for providing predictive alerts for workplace safety. In some implementations, one or more process blocks of FIG. 5 may be performed by safety analysis platform 240. In some implementations, one or more process blocks of FIG. 5 may be performed by another device or a group of devices separate from or including safety analysis platform 240, such as source device 210, environmental sensor 220, physiological sensor 230, workplace safety device 250, worker device 260, and/or workplace device 270.

As shown in FIG. 5, process 500 may include obtaining work information associated with a worker and/or a workplace (block 510). For example, safety analysis platform 240 may obtain work information from source device 210, worker device 260, workplace device 270, and/or one or more other devices. In some implementations, safety analysis platform 240 may receive the work information periodically. Additionally, or alternatively, safety analysis platform 240 may receive the work information based on providing a request to source device 210, worker device 260, workplace device 270, and/or one or more other devices.

Work information may include information relating to a workplace (e.g., a worksite) and/or information relating to a worker. For example, work information may include job information associated with a worker. Job information may include a type of work being performed or to be performed by a worker, such as climbing (e.g., a tower, a pole, a ladder, or other equipment), mining, oil rig work, lifting, construction work, electrical work, digging, computer work, or the like. In some implementations, safety analysis platform 240 may automatically obtain the job information by interacting with a work order system to obtain and/or analyze a work order for job information. Safety analysis platform 240 may use the job information to generate a safety score for a worker, as described in more detail below. For example, safety analysis platform 240 may assign different values to different types of work, and a value assigned to the type of work may impact the value of the safety score.

As another example, work information may include worker schedule information, such as a work schedule, an amount of time the worker has been working on a current shift, a quantity and/or length of shifts over a time period (e.g., a day, a week, a month, or a year), a time of the shift (e.g., a time of day), a length of time between shifts, or the like. In some implementations, safety analysis platform 240 may automatically obtain the worker schedule information by interacting with a scheduling system to obtain and/or analyze the schedule information. Safety analysis platform 240 may use the worker schedule information to generate a safety score for a worker, as described in more detail below. For example, safety analysis platform 240 may assign different values to different worker schedule factors described above, and a value assigned to the worker schedule factor may impact the value of the safety score.

As yet another example, work information may include work history information relating to a worker's work history, such as an experience level of the worker, a historical record of the worker's performance, a historical record of rules violations and/or when rules violations occurred, performance review information, or the like. In some implementations, safety analysis platform 240 may automatically obtain the work history information by interacting with a workplace record system to obtain and/or analyze the work history information. Safety analysis platform 240 may use the work history information to generate a safety score for a worker, as described in more detail below. For example, safety analysis platform 240 may assign different values to different work history factors described above, and a value assigned to the work history factor may impact the value of the safety score.

As still another example, work information may include layout information relating to a layout of a workplace (e.g., an architectural design, a building layout, a worksite layout, an equipment layout, and/or a proximity of equipment to locations in the workplace), information that identifies safety zones associated with a workplace (e.g., where different zones may have different levels of risk), or the like. In some implementations, safety analysis platform 240 may automatically obtain the layout information by interacting with a layout management system that stores layout information. Safety analysis platform 240 may use the layout information to generate a safety score for a worker, as described in more detail below. For example, safety analysis platform 240 may assign different values to different layout factors described above, and a value assigned to the layout factor may impact the value of the safety score.

As an additional example, work information may include equipment information about equipment in the workplace. The equipment information may identify an equipment type, an equipment model, an age of the equipment, an expected lifespan of the equipment, an amount of time since last maintenance or inspection of the equipment, a prediction of when the equipment will next need maintenance, a time when the equipment was installed (e.g., as may indicate an extent that workers are familiar with the equipment), or the like. In some implementations, safety analysis platform 240 may automatically obtain the equipment information by interacting with an equipment management system that stores equipment information. Safety analysis platform 240 may use the equipment information to generate a safety score for a worker, as described in more detail below. For example, safety analysis platform 240 may assign different values to different equipment factors described above, and a value assigned to the equipment factor may impact the value of the safety score.

In some implementations, safety analysis platform 240 may generate or modify a model of a worker's expected behavior based on observations over time. In this case, safety analysis platform 240 may compare current worker behavior to the model to determine whether the worker is behaving normally or abnormally. In some implementations, the model may be based on an individual worker. Additionally, or alternatively, the model may be based on a group of workers (e.g., at the same or similar workplaces, performing the same or similar types of work, with the same or similar level of experience, or that share one or more of the same or similar factors described above). In some implementations, the model may be used to compare measured behavior of an individual worker. Additionally, or alternatively, the model may be used to compare measured behavior of a group of workers.

In this way, safety analysis platform 240 may take into account specific workplaces and/or specific workers to provide more accurate safety alerts.

As further shown in FIG. 5, process 500 may include obtaining one or more environmental measurements associated with the workplace (block 520). For example, safety analysis platform 240 may obtain environmental measurements from one or more environmental sensors 220. In some implementations, safety analysis platform 240 may receive the environmental measurements periodically. Additionally, or alternatively, safety analysis platform 240 may receive the environmental measurements based on providing a request to one or more environmental sensors 220 or a device associated with one or more environmental sensors 220.

An environmental measurement may include a measurement of an environmental condition sensed by environmental sensor 220. For example, an environmental measurement may include a measurement of a chemical substance in the workplace environment (e.g., a chemical element or compound), such as a carbon monoxide level, an oxygen level, or the like. As another example, environmental measurements may include a measurement of a temperature level, a humidity level, a moisture level, a wind level, a smoke level, a radiation level, or the like. As yet another example, environmental measurements may include a measurement of a speed, a velocity, an acceleration (e.g., a positive acceleration or a negative acceleration, or deceleration), an angular acceleration, a geographic location, a change in geographic location, an altitude, a force exerted on environmental sensor 220, an orientation of environmental sensor 220, a change in orientation of environmental sensor 220, or the like. As still another example, environmental measurements may include measurement of a time of day, an amount of light, a location of a worker in the workplace, or the like.

In some implementations, safety analysis platform 240 may measure an environmental condition over time. For example, safety analysis platform 240 may measure a cumulative exposure to radiation over the course of a work shift. In some implementations, an environmental measurement may include a current or real time measurement of an environmental condition. Additionally, or alternatively, an environmental measurement may include a projection of a future environmental condition, such as a weather forecast. In the case of a weather forecast, safety analysis platform 240 may obtain the weather forecast from source device 210 (e.g., a web server that stores weather forecast information).

In this way, safety analysis platform 240 may take environmental factors into consideration when generating safety alerts, thereby increasing accuracy of the alerts and conserving computing resources by selectively taking action based on a reliable indicator of worker or workplace safety.

As further shown in FIG. 5, process 500 may include obtaining one or more physiological measurements associated with the worker (block 530). For example, safety analysis platform 240 may obtain physiological measurements from one or more physiological sensors 230. In some implementations, safety analysis platform 240 may receive the physiological measurements periodically. Additionally, or alternatively, safety analysis platform 240 may receive the physiological measurements based on providing a request to one or more physiological sensors 230 or a device associated with one or more physiological sensors 230.

A physiological measurement may include a measurement of a physiological indicator, of a worker, sensed by physiological sensor 230. For example, a physiological measurement may include a measurement of a heart rate, a blood pressure, a glucose level, a pulse, or the like. As another example, a physiological measurement may include a measurement of an acceleration, a distance traveled, a physical orientation, a heat flux, a skin conductivity, a temperature (e.g., a skin temperature of the worker, or an air temperature proximate to the worker), a calorie count, sleep data, motion, moisture (e.g., perspiration), noises made by the worker, or the like. As yet another example, a physiological measurement may include a measurement of a chemical substance in, on, or near the body of the worker (e.g., a chemical element or compound), such as oxygen, carbon dioxide, lactate, testosterone, cortisol, glucose, glucagon, glycogen, insulin, starch, free fatty acid, triglycerides, monoglycerides, glycerol, pyruvate, lipids, other carbohydrates, ketone bodies, choline, or the like.

In some implementations, safety analysis platform 240 may measure the physiological indicator over time. For example, safety analysis platform 240 may measure an average heart rate of a worker over the course of a work shift. In some implementations, a physiological measurement may include a current or real time measurement of the physiological indicator. Additionally, or alternatively, a physiological measurement may include a projection of a future physiological indicator, such as a heart rate that is increasing towards a threshold that could indicate danger to the worker.

In this way, safety analysis platform 240 may take physiological factors into consideration when generating safety alerts, thereby increasing accuracy of alerts and personalizing alerts for particular workers.

As further shown in FIG. 5, process 500 may include generating a safety score for the worker based on the work information, the environmental measurement(s), and/or the physiological measurement(s) (block 540). For example, safety analysis platform 240 may generate a safety score for a worker based on one or more factors described herein. For example, the safety score may be based on one or more work factors associated with work information described in connection with block 510, one or more environmental factors associated with one or more environmental measurements described in connection with block 520, and/or one or more physiological factors associated with the physiological measurements described in connection with block 530.

In some implementations, safety analysis platform 240 may apply different weights to different factors when generating the safety score. For example, safety analysis platform 240 may apply different weights to different factor types (e.g., work factors, environmental factors, or physiological factors). As an example, safety analysis platform 240 may apply a first (e.g., high) weight to physiological factors, may apply a second (e.g., medium) weight to environmental factors, and may apply a third (e.g., low) weight to work factors. These weight value assignments are provided as an example, and weight values may be assigned to different factor types in a different manner, in some implementations.

As another example, safety analysis platform 240 may apply different weights to different individual factors. For example, regarding work factors, safety analysis platform 240 may apply a first (e.g., high) weight to an amount of time the worker has been on a shift, may apply a second (e.g., medium) weight to an amount of worker experience, and may apply a third (e.g., low) weight to a quantity of shifts over time. Similarly, regarding environmental factors, safety analysis platform 240 may apply a first (e.g., high) weight to a weather forecast, may apply a second (e.g., medium) weight to a workplace temperature, and may apply a third (e.g., low) weight to a worker location. Similarly, regarding physiological factors, safety analysis platform 240 may apply a first (e.g., high) weight to a heart rate, may apply a second (e.g., medium) weight to an amount of skin perspiration, and may apply a third (e.g., low) weight to a number of steps taken. These weight value assignments are provided as examples, and weight values may be assigned to different individual factors in a different manner, in some implementations.

As still another example, safety analysis platform 240 may apply different weights both to different factor types and to different individual factors. For example, a different weight may be applied to work factors as compared to environmental factors, and different weights may also be applied to different individual factors among the work factors and to different individual factors among the environmental factors.

In some implementations, safety analysis platform 240 may generate the safety score based on applying a model, applying machine learning, applying artificial intelligence, or the like. For example, safety analysis platform 240 may receive a training set of data (e.g., known factors) that led to accidents, and may apply machine learning to the training set to identify factors and/or combinations of factors likely to cause an accident. Safety analysis platform 240 may then apply the model, as factors are received, to calculate a safety score representative of a likelihood of an accident. In some implementations, safety analysis platform 240 may continue to train the model when an accident occurs and/or when an incident is reported. In some implementations, safety analysis platform 240 may take into account thousands, millions, or more data points for the model, machine learning, artificial intelligence, or the like. Safety analysis platform 240 may analyze this large number of data points to determine combinations of factors that may lead to an accident.

As an example, safety analysis platform 240 may generate a safety score that indicates a high likelihood of an accident based on a type of work (e.g., climbing a tower) combined with an environmental measurement (e.g., wind). Moreover, if rain is present at the worksite, safety analysis platform 240 may generate a safety score that indicates an even higher likelihood of an accident. Further still, if it is also dark outside, safety analysis platform 240 may generate a safety score that indicates a still higher likelihood of an accident.

In some implementations, safety analysis platform 240 may use a first safety score for a first worker to generate a second safety score for a second worker. For example, the first worker may have a high risk safety score, indicating a high likelihood of an accident, and the second worker may be located near the first worker within the workplace. In this case, the second worker may be likely to be impacted by an accident caused by the first worker. Thus, safety analysis platform 240 may use generate the second safety score to indicate a higher risk of an accident for the second worker than if the second worker were not located near the first worker. In some implementations, safety analysis platform 240 may use the first safety score and locations of the workers (e.g., a distance or proximity between the first worker and the second worker) to update the second safety score (e.g., to update a previously calculated second safety score for the second worker). For example, safety scores of workers who are located farther from the first worker may be impacted less by the first safety score than workers who are located closer to the first worker.

In some implementations, safety analysis platform 240 may generate the safety score. In this case, safety analysis platform 240 may use real-time information or information most recently received from other devices to generate the safety score, thereby improving the accuracy and timeliness of the safety score. In some implementations, workplace safety device 250 may generate the safety score. In this case, workplace safety device 250 may use the most recently received and/or locally stored information to generate the safety score, allowing the safety score to be generated regardless of whether the workplace safety device 250 is connected to a network and/or in communication with safety analysis platform 240.

In some implementations, safety analysis platform 240 may generate the safety score if workplace safety device 250 is in communication with safety analysis platform 240, and workplace safety device 250 may generate the safety score if workplace safety device 250 is not in communication with safety analysis platform 240. In this way, workplace safety device 250 may conserve network resources by preventing repeated attempts to communicate with safety analysis platform 240 when not in direct communication with safety analysis platform 240, while still ensuring accurate calculation of the safety score. Additionally, or alternatively, information for generating the safety score may be passed via a chain of workplace safety devices 250 or other communication devices to safety analysis platform 240. In this way, the accuracy of the safety score may be improved by ensuring that data is obtained for workplace safety devices 250, even when not in direct communication with safety analysis platform 240.

In some implementations, the safety score may indicate a current condition associated with a worker (e.g., the worker is currently located in a dangerous area, has currently been exposed to a dangerous chemical or gas, is currently associated with a high likelihood of an accident, or the like). Additionally, or alternatively, the safety score may indicate a future condition predicted to be associated with the worker (e.g., the worker is walking toward a dangerous area, is near an area with dangerous chemicals or gases, is predicted to have an accident, or the like). In other words, the safety score may indicate a current risk level associated with the worker and/or a predicted future risk level associated with the worker. In some implementations, safety analysis platform may provide a recommendation to mitigate the current risk level and/or the predicted future risk level, as described below in connection with providing an alert.

As further shown in FIG. 5, process 500 may include selectively providing an alert, regarding the worker, based on the safety score (block 550). For example, safety analysis platform 240 may provide an alert to workplace safety device 250. In some implementations, safety analysis platform 240 may provide an alert when the safety score satisfies a threshold. The alert may cause an output component 360 to output a signal. For example, output component 360 may output a visual signal (e.g., to cause an LED light to turn red) that may be seen by the user of workplace safety device 250, an audible signal (e.g., a beeping alarm or an automated verbal instruction) that may be heard by the user of workplace safety device 250, or the like. Additionally, or alternatively, output component 360 may output the visual signal so as to be visible to other workers proximate to the user of workplace safety device 250. Additionally, or alternatively, output component 360 may output the audible signal so as to be audible to other workers proximate to the user of workplace safety device 250. In this way, a worker who might not see the visual signal may still be alerted by the audible signal, and a worker who might not hear the audible signal may still be alerted by the visible signal. In some implementations, a particular combination, pattern, or the like of visible and/or audible signals may indicate a particular alert.

In some implementations, safety analysis platform 240 may provide an alert to worker device 260 (e.g., a mobile phone). For example, safety analysis platform 240 may provide the alert to cause worker device 260 to prompt the user (e.g., by displaying a message on a display screen of worker device 260) to be careful, to stop work immediately, to take a rest, or the like. Further to the example, worker device 260 may provide an audible signal, a vibration, or the like, to notify the user of worker device 260 of the message. In some implementations, safety analysis platform 240 may concurrently provide multiple alerts to multiple workplace safety devices 250, worker devices 260, and/or other devices.

In some implementations, safety analysis platform 240 and/or workplace safety device 250 may identify one or more nearby workplace safety devices 250 and/or nearby worker devices 260 (e.g., located within a threshold proximity of a worker or workplace safety device 250 associated with the alert, in communication with workplace safety device 250, etc.), and may provide an alert to those nearby devices. In this way, the workers associated with those devices may be more vigilant, and may also make sure that the affected worker is safe, takes a break, or the like.

In some implementations, safety analysis platform 240 may, based on a safety score, provide an instruction to a particular piece of equipment to shut down the piece of equipment, to reboot the piece of equipment, to reduce throughput or operating speed of the piece of equipment, to reconfigure the piece of equipment, to turn off power to a particular area of a workplace, to cause a message to be sent to a user (e.g., a supervisor, an inspector, a technician, etc.), to populate portions of a user interface, to turn on a camera, to change focus of the camera (e.g., to move, zoom, or pan to view a location of a worker associated with a high risk safety score, based on a location of workplace safety device 250 or worker device 260), or the like. In this way, safety analysis platform 240 may automatically take preventative measures to reduce likelihood of an accident or to minimize risk from an accident.

In some implementations, safety analysis platform 240 may provide an alert to workplace device 270. Based on the alert, workplace device 270 may display information to a user, such as a supervisor, associated with the workers and/or the workplace. For example, workplace device 270 may provide various user interfaces that a supervisor may use to keep workers safe, as described below in connection with FIGS. 6-20.

In this way, safety analysis platform 240 may increase worker safety and reduce workplace accidents by using environmental measurements, physiological measurements, and/or work information to predict when workplace accidents are likely to occur and to send alerts to prevent such accidents from occurring. As a result, worker injuries and/or fatalities may be prevented, property damage may be avoided, and downtime of workers and/or equipment may be reduced.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6-20 are diagrams of example implementations relating to the example process shown in FIG. 5. As shown in FIGS. 6-20, workplace device 270 may display one or more user interfaces in various states representing different safety-related circumstances associated with the workplace and/or workers. Workplace device 270 may display, update, and/or alter the user interfaces based on information obtained from safety analysis platform 240 and/or one or more other devices of environment 200, such as information and/or changes to information associated with work factors, environmental factors, and/or physiological factors. In some implementations, collection, processing, and display of data described herein may occur in real-time.

Figure 6:
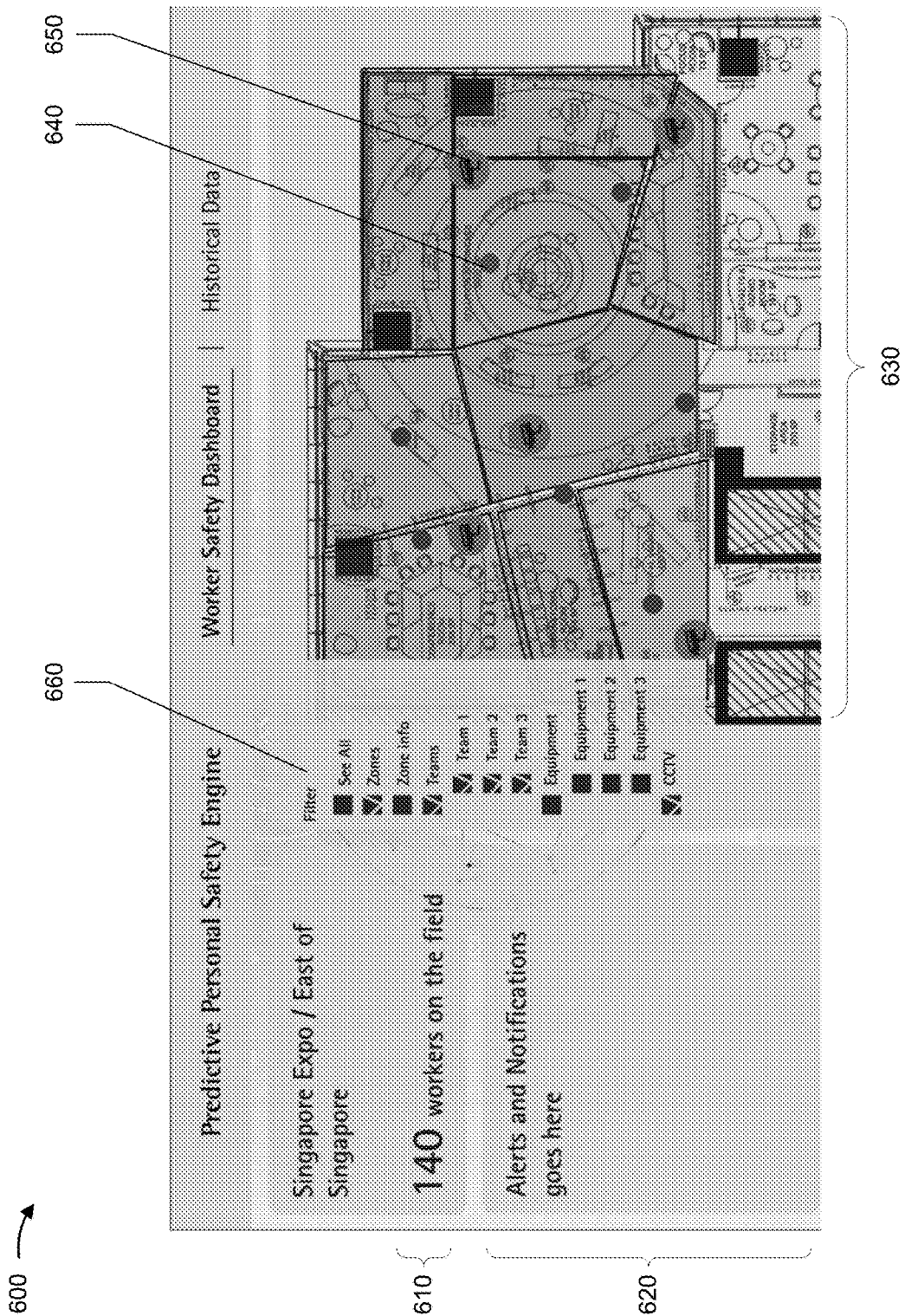
FIGS. 6-20 are diagrams of example implementations relating to the example process shown in FIG. 5.

As shown in FIGS. 6-18, workplace device 270 may display a worker safety dashboard upon selection by a user. As shown in FIG. 6, workplace device 270 may display the worker safety dashboard to indicate a quantity of workers in the workplace (shown by reference number 610). In some implementations, workplace device 270 may provide alerts about workers (shown by reference number 620). In some implementations, workplace device 270 may provide a map of a layout of the workplace (shown by reference number 630). In some implementations, workplace device 270 may indicate, on the map, locations of workers using icons (shown by reference number 640). In some implementations, workplace device 270 may display the icons differently based on a safety score associated with the worker (e.g., using different colors, different sizes, etc.).

In some implementations, workplace device 270 may display, on the map, icons representative of locations of cameras (shown by reference number 650). In this case, a user may interact with one of the icons to cause workplace device 270 to display a video feed from a camera represented by the icon. In some implementations, workplace device 270 may include input mechanisms (shown by reference number 660) for a user (e.g., a supervisor) to select different information to display, such as by clicking on corresponding boxes. For example, the supervisor may select different portions of the map to show or hide those different portions and/or worker icons representing workers associated with those different portions. As another example, the supervisor may select different groups of workers (e.g., teams) to show or hide icons representing workers associated with those groups. As another example, the supervisor may interact with the user interface to show or hide the camera icons, icons representing workplace equipment, information relating to different zones (e.g., a zone number, a risk level associated with a zone, zone restrictions, etc.), to show or hide different floors of a workplace layout, to show or hide different buildings in the workplace, or the like. In this way, computing resources (e.g., memory resources, processing resources, etc.) may be conserved by showing only a subset of all possible information.

Figure 7:
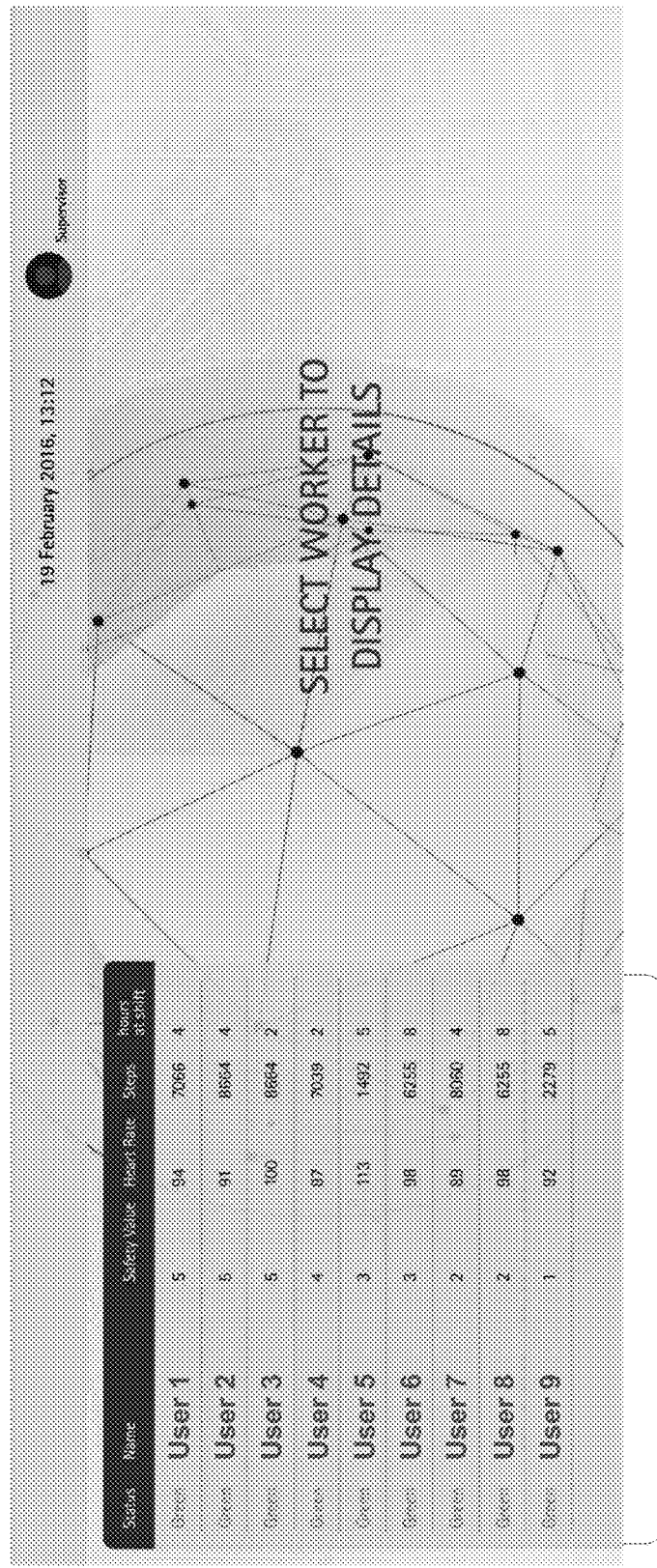

As shown in FIG. 7, workplace device 270 may cause the worker safety dashboard to show a list (shown by reference number 710) of workers (shown as User 1 through User 9) with information regarding a worker status (under "Status") based on a safety score, a worker name (under "Name"), a worker safety score (under "Safety Value"), physiological information (under "Heart Rate" and "Steps"), work information (under "Hours at Shift"), and/or environmental information. Workplace device 270 may allow a user to select a worker, such as by clicking on a portion of the user interface that identifies the worker, such that the user interface displays details associated with the selected worker.

Figure 8:
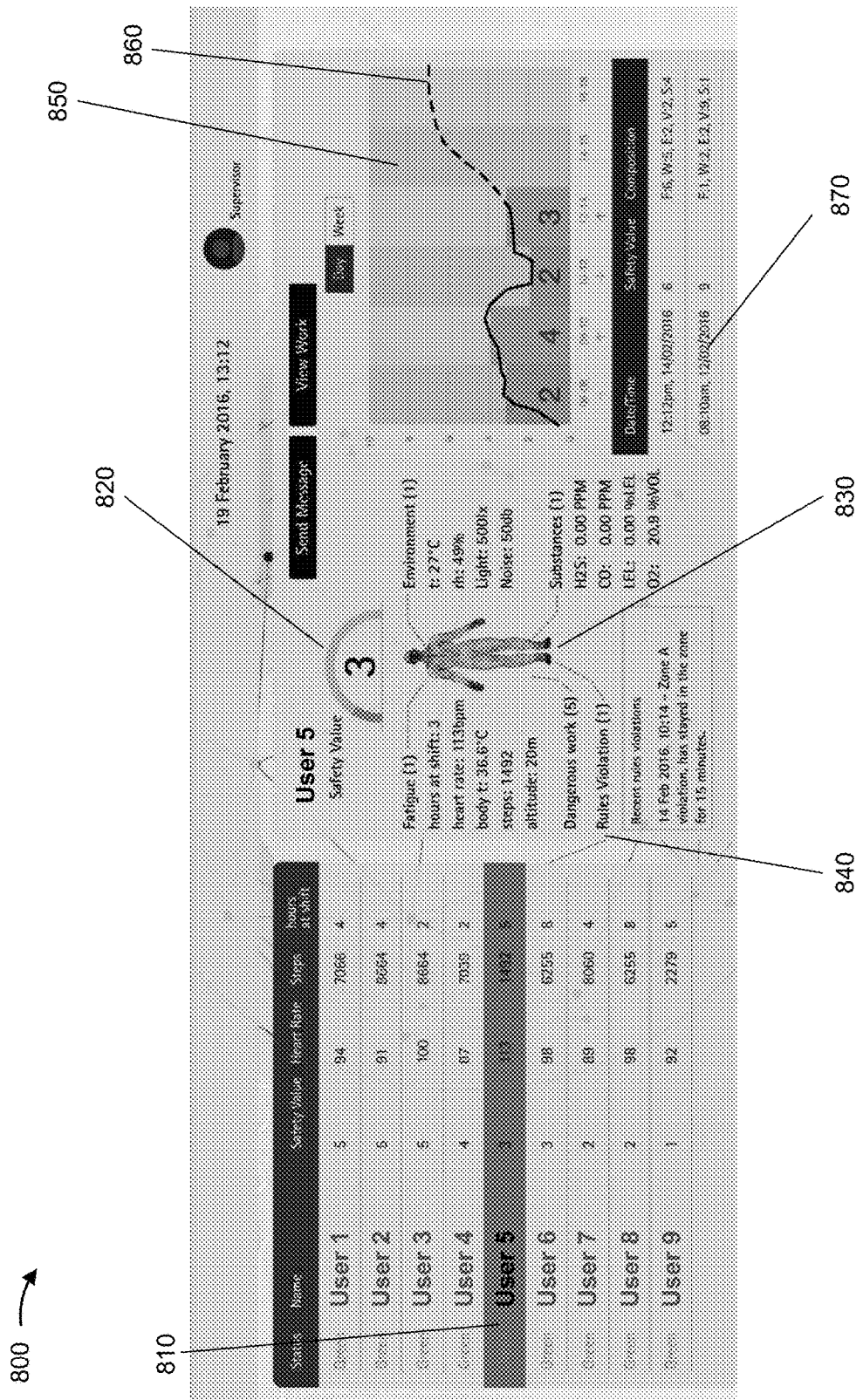

As shown in FIG. 8, if a user selects "User 5" on the worker safety dashboard (shown by reference number 810), workplace device 270 may display a safety score for User 5 (shown by reference number 820). Workplace device 270 may display an area showing different factors (shown by reference number 830), a value of a factor that indicates a likelihood of an accident due to that factor (for one or more displayed factors), and/or an impact of the factor on the safety score. Workplace device 270 may also indicate rules violations associated with the selected worker (shown by reference number 840). Workplace device 270 may further indicate a maximum, a minimum, and/or an average safety score, such as plotted on a graph over a time period (shown by reference number 850). For example, workplace device 270 may indicate a maximum safety score for different days. Workplace device 270 may also indicate a prediction of future safety scores, shown as a dotted line on the graph (shown by reference number 860), based on historical safety scores and model analysis. In some implementations, a current safety score may be calculated based on an expected future safety score (e.g., a prediction of a likelihood of a future accident). Workplace device 270 may further provide a recommendation for the selected worker based on historical and/or predicted safety scores (e.g., take a day off, switch to a safer task for a day, etc.). Workplace device 270 may indicate the most recent safety scores that satisfied a threshold, and when those safety scores occurred (shown by reference number 870).

Figure 9:
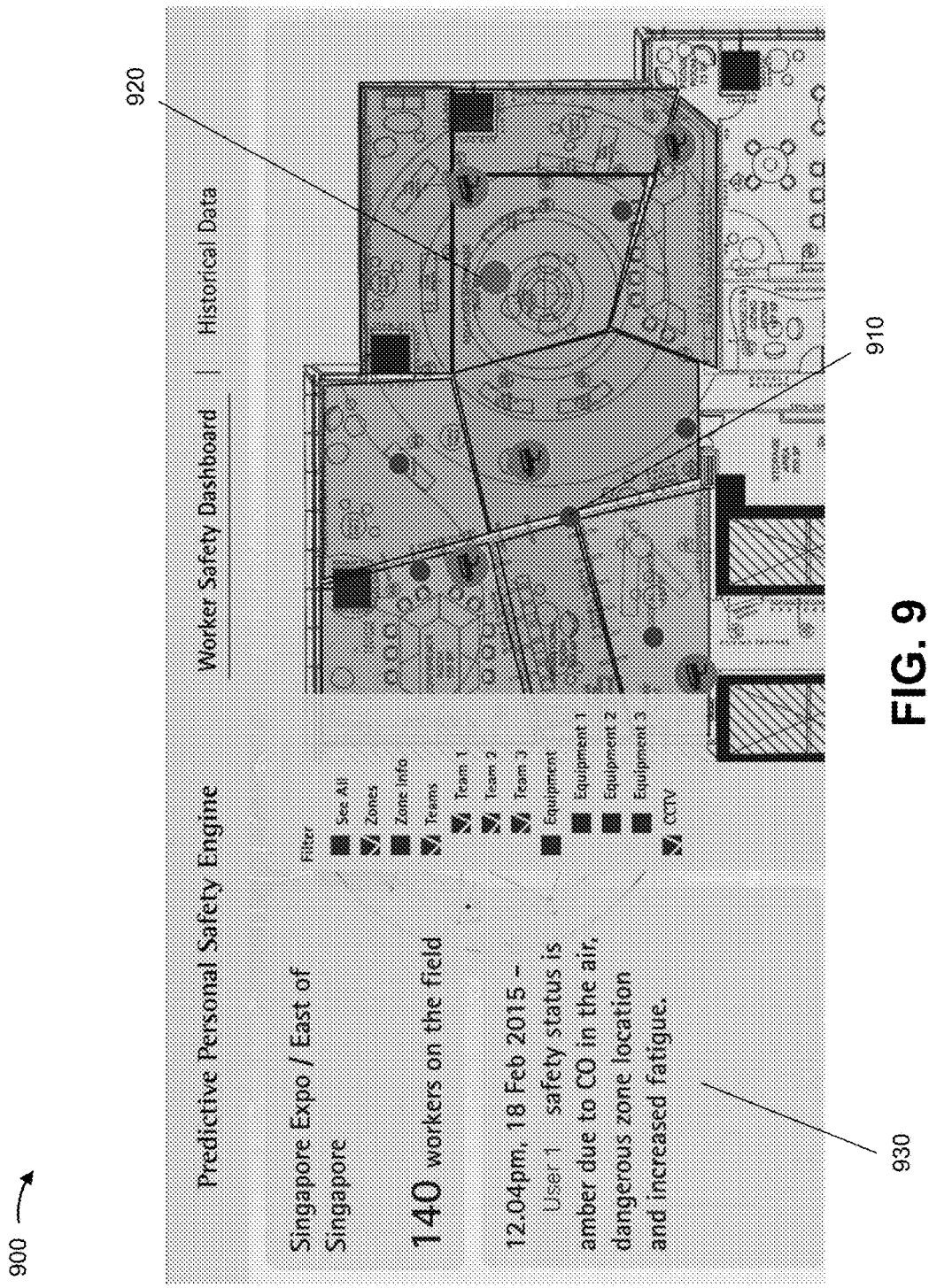

As shown in FIG. 9, workplace device 270 may display an icon for a selected worker in a different manner than icons for other workers (shown by reference number 910), such as an icon that is larger than the icons for the other workers. Additionally, or alternatively, when a safety score for a worker satisfies a threshold, workplace device 270 may receive an alert and may provide an icon for that worker in a different manner than other icons for workers not associated with an alert, such as showing the icon in a different color (shown by reference number 920). For example, a green icon may indicate a low risk safety score, an amber icon may indicate a medium risk safety score, and a red icon may indicate a high risk safety score. Additionally, or alternatively, workplace device 270 may provide alerts and/or notifications regarding the workers (shown by reference number 930).

Figure 10:
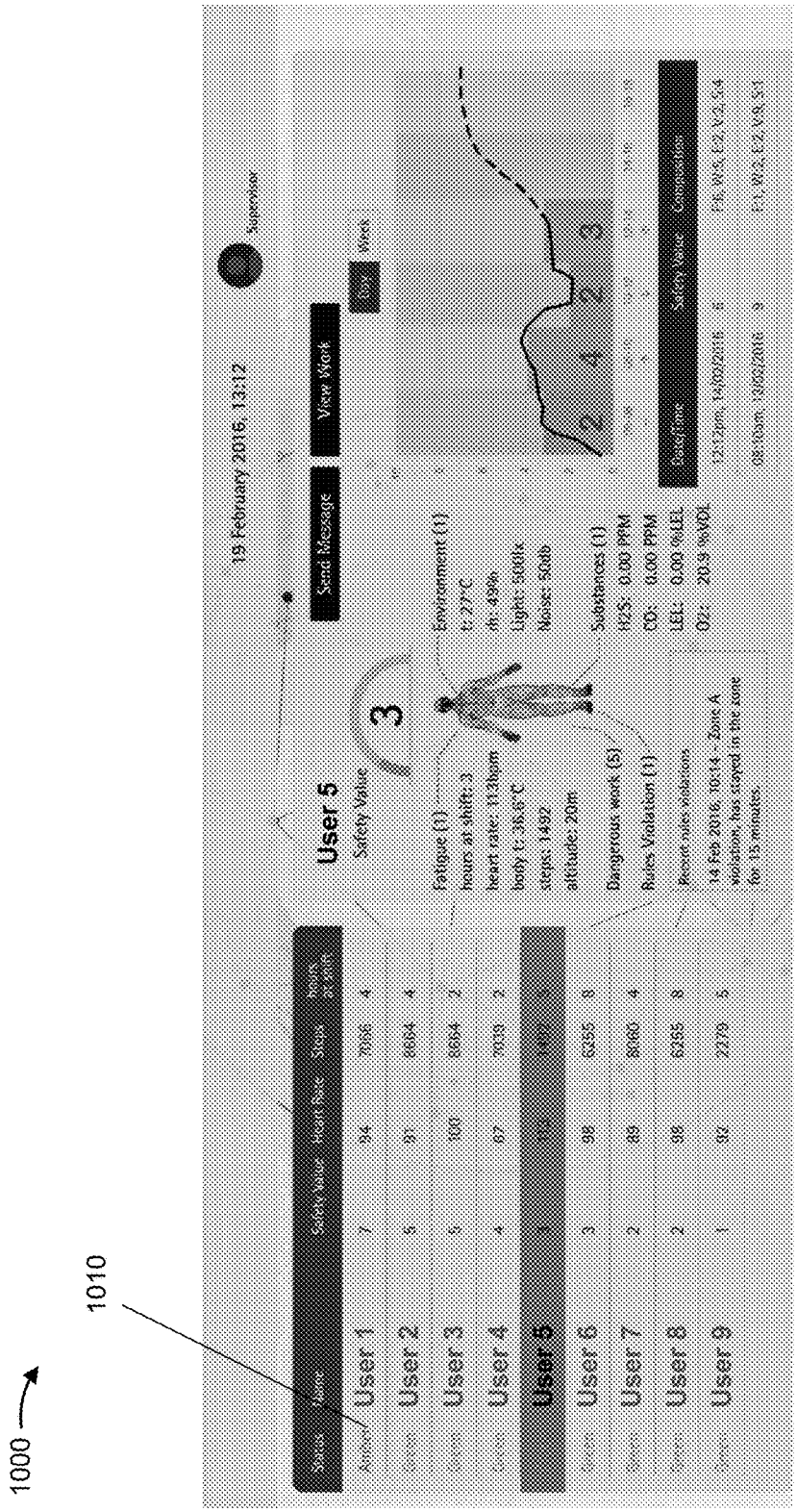
Figure 11:
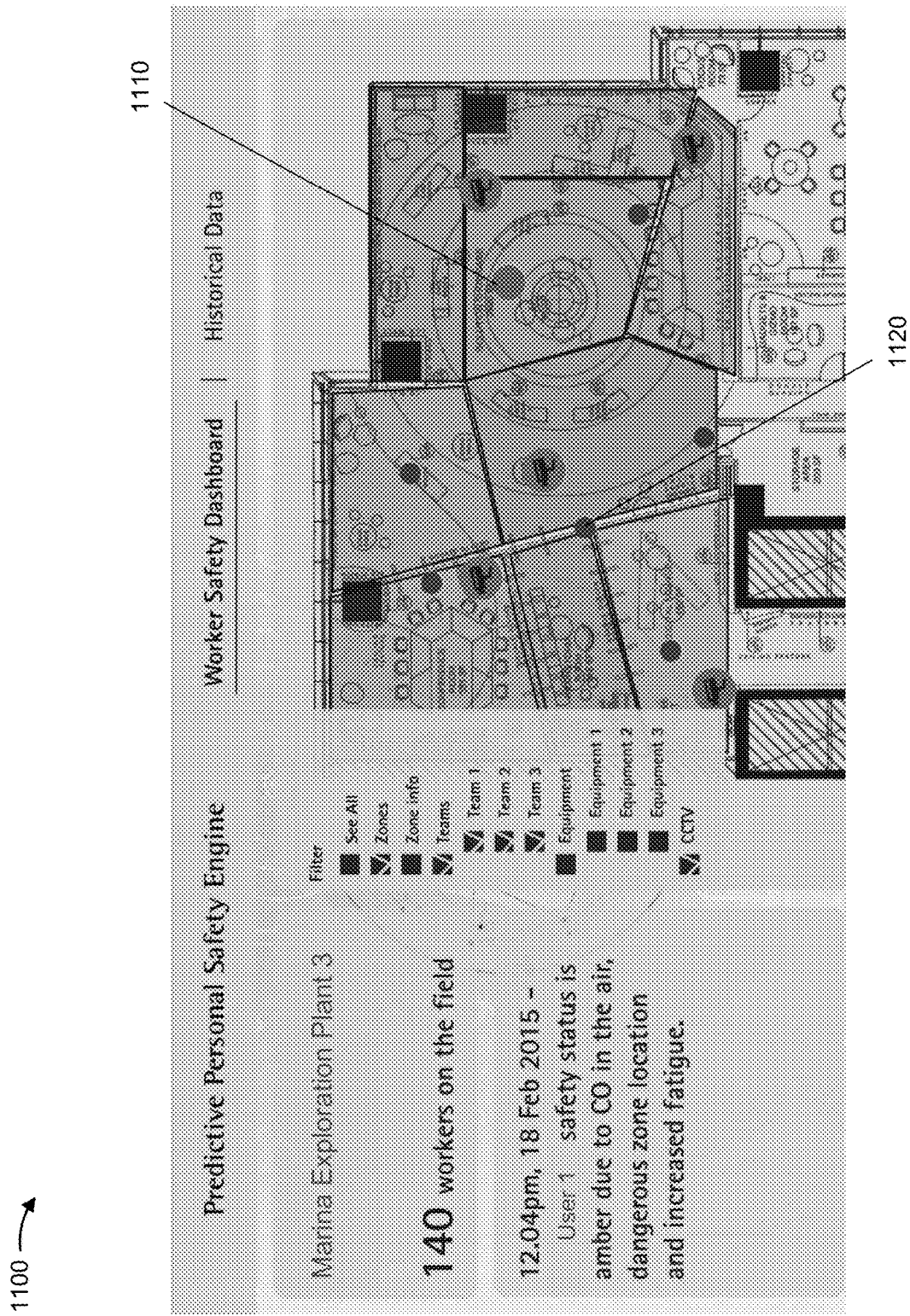

As shown in FIG. 10, workplace device 270 may update information in the list of workers based on receiving the alert (shown by reference number 1010). In some implementations, information may be updated in real time as the information is received and/or processed. As an example, a status of User 1 may be changed from green to amber, indicating a medium risk safety score. The user of workplace device 270 (e.g., a supervisor) may then select User 1 to obtain more information about User 1, such as why the status of User 1 was changed from green to amber. As shown in FIG. 11, as a result of the user selecting User 1, the icon for User 1 is enlarged (shown by reference number 1110) and the icon for User 5 is shrunk (shown by reference number 1120) based on supervisor selection of User 1.

Figure 12:
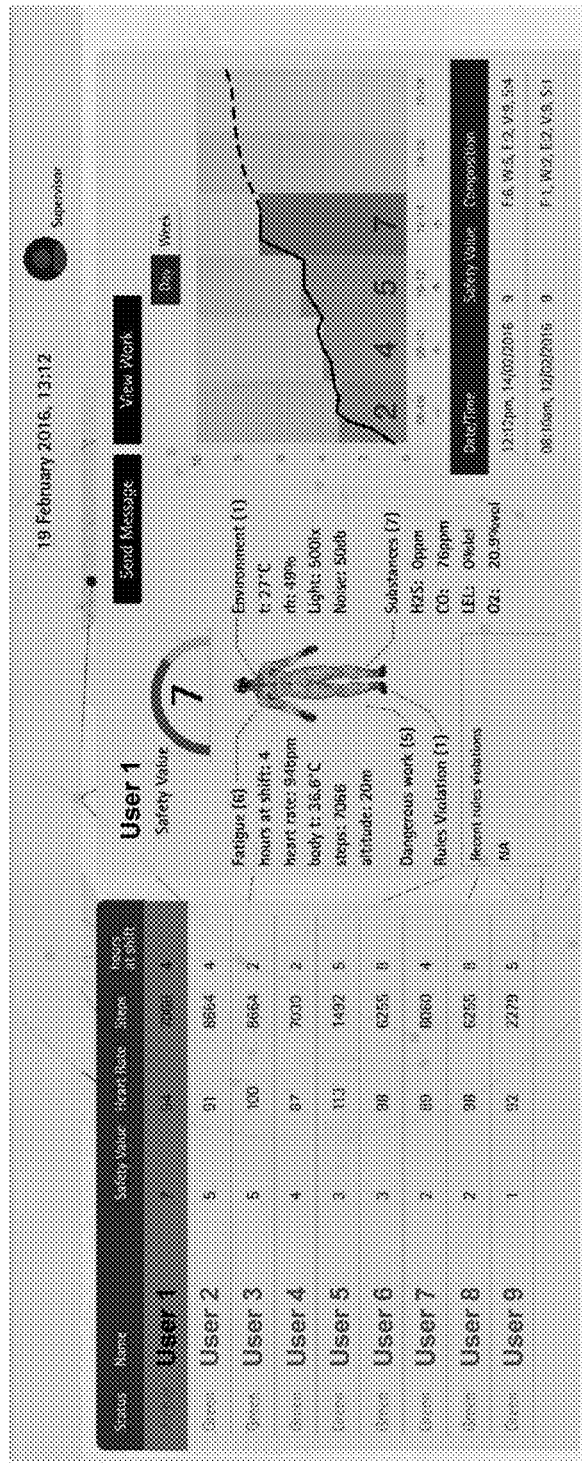

As shown in FIG. 12, selected User 1 has a safety score of 7, indicating a medium level of risk. As further shown in FIG. 12, User 1 has a fatigue factor score of 6, a dangerous work factor score of 5, and a dangerous substance factor score of 7. In some implementations, the safety score may be calculated as the maximum of one or more of the factor scores. In this case, where the maximum factor score for User 1 is 7, the safety score is 7. Additionally, or alternatively, the safety score may be calculated as a combination of multiple factor scores.

Figure 13:
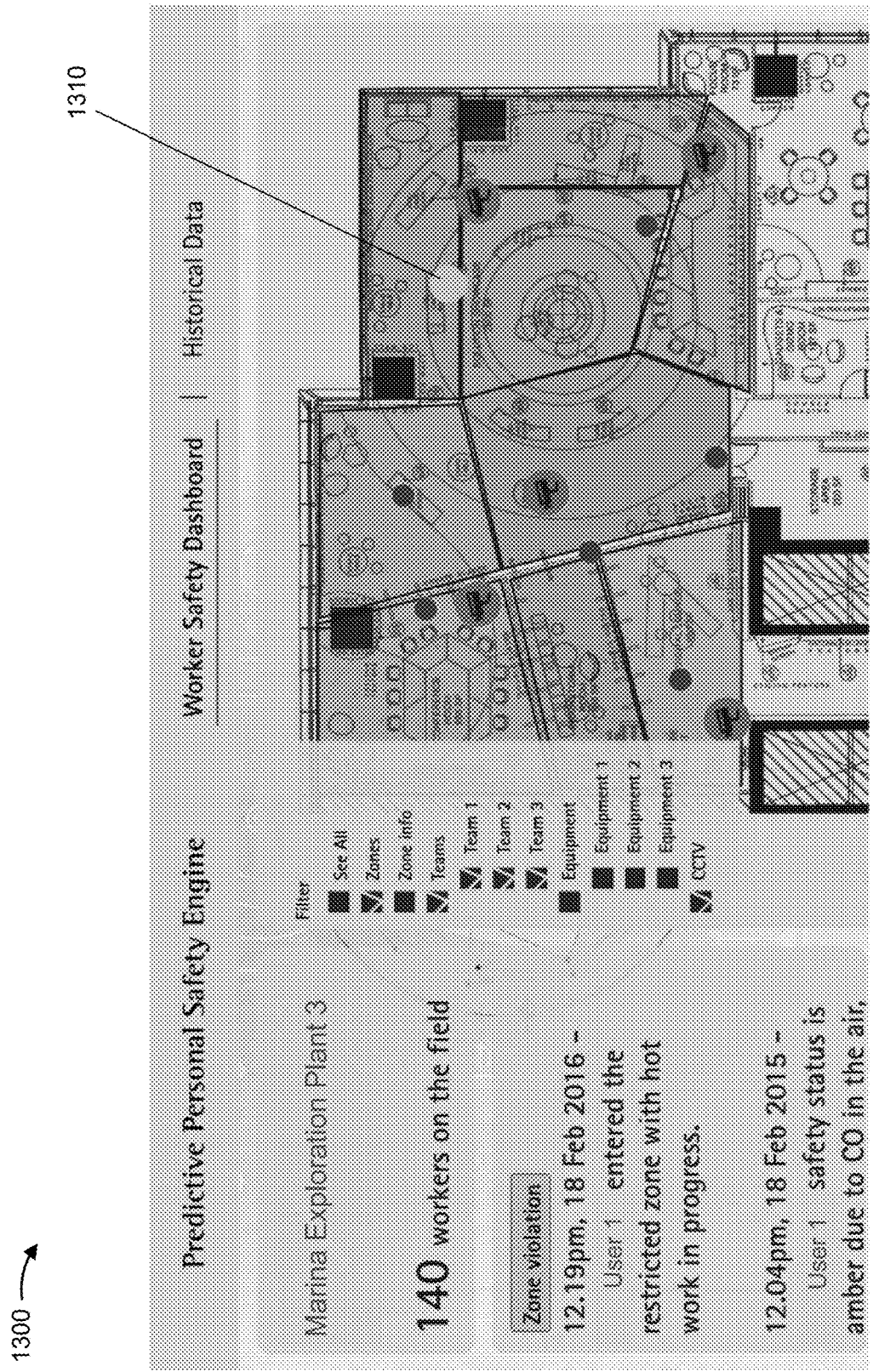
Figure 14:
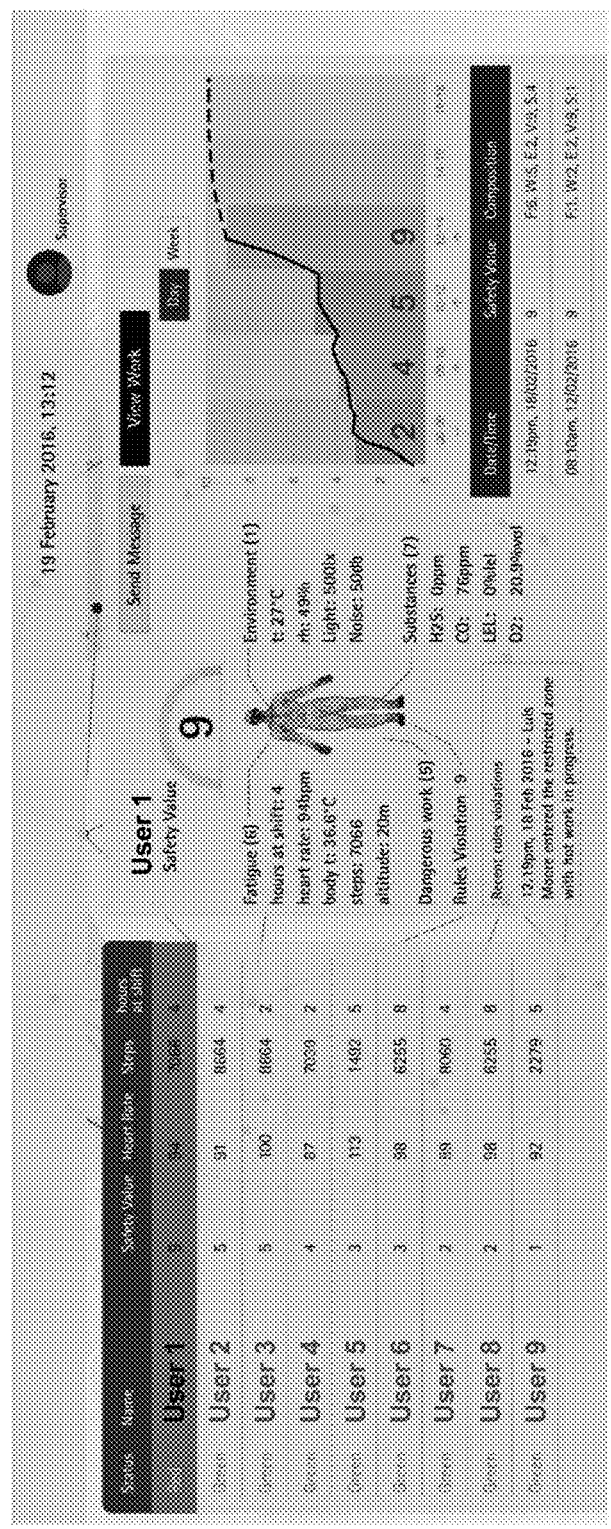

As shown in FIG. 13, when User 1 enters a restricted zone, workplace device 270 displays a zone violation and causes the icon for User 1 to turn to red, indicating a high risk (shown by reference number 1310). As shown in FIG. 14, as a result of User 1 entering the restricted zone, the rules violation factor score for User 1 changes to 9, increasing the maximum factor score of User 1 to 9, and the safety score of User 1 changes to 9, accordingly.

Figure 15:
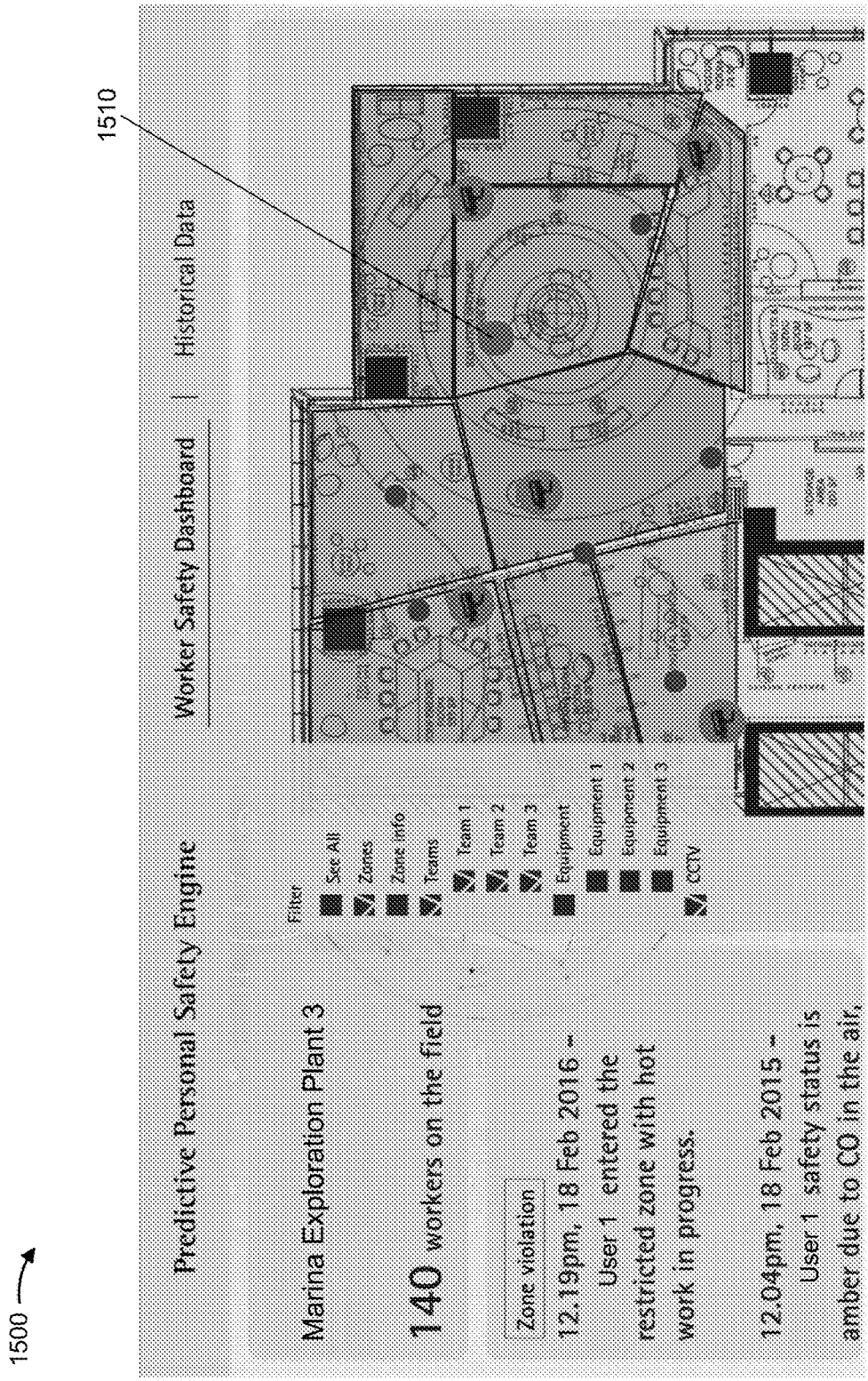
Figure 16:
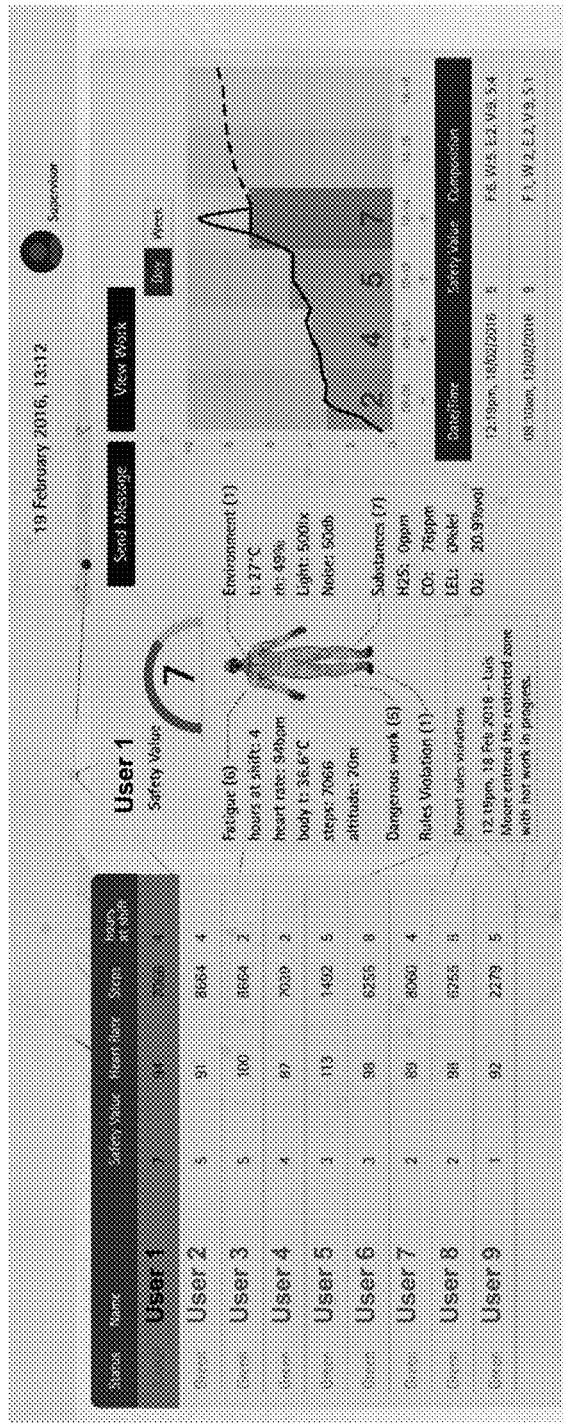

As shown in FIG. 15, when User 1 leaves the restricted zone, the icon for User 1 changes back to amber (shown by reference number 1510). As shown in FIG. 16, as a result of User 1 leaving the restricted zone, the rules violation factor score of User 1 changes from 9 to 1, the maximum factor score of User 1 changes back to 7, and the safety score of User 1 changes back to 7, accordingly.

Figure 17:
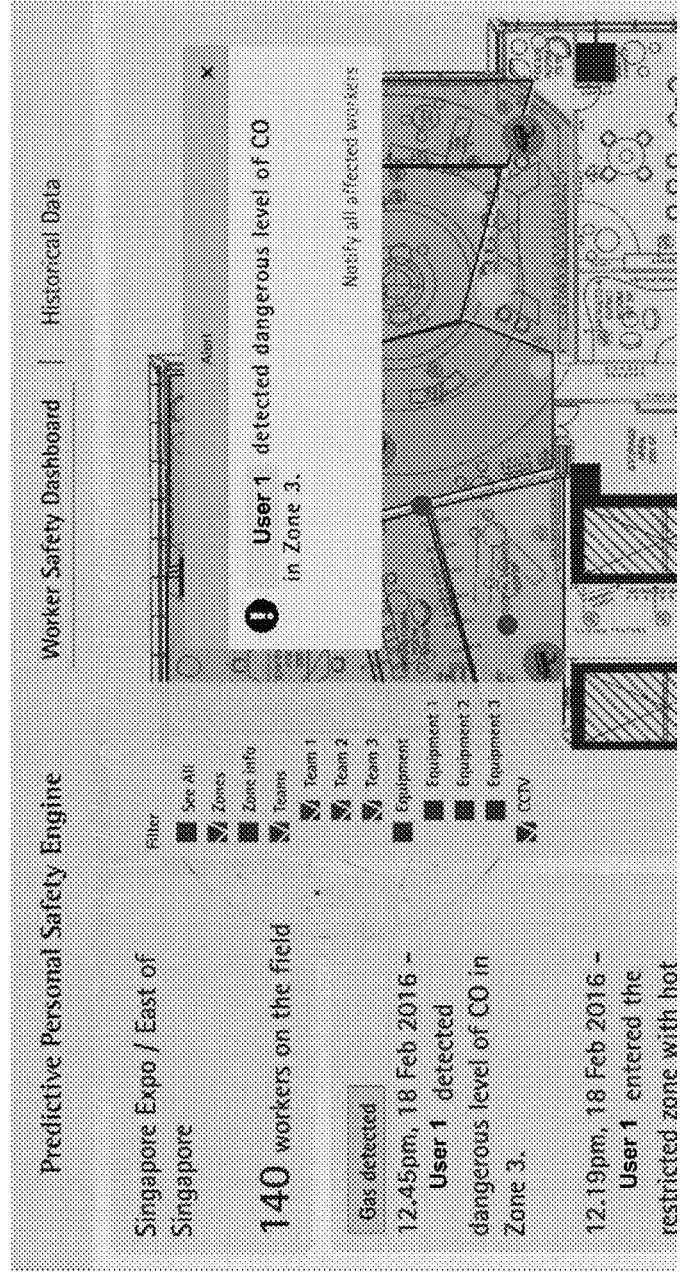
Figure 18:

As shown in FIG. 17, when User 1 enters an area where the workplace safety device 250 of User 1 detects a dangerous level of carbon monoxide, workplace device 270 receives an alert from safety analysis platform 240 and, based on the alert, displays a warning and changes the icon of User 1 to red. In some implementations, safety analysis platform 240 may also provide an alert to workers proximate to User 1 and workplace device 270 may change the icons of those workers to red. As shown in FIG. 18, as a result of the detection of a dangerous level of carbon monoxide, the safety score of User 1 increases to 10.

Figure 19:
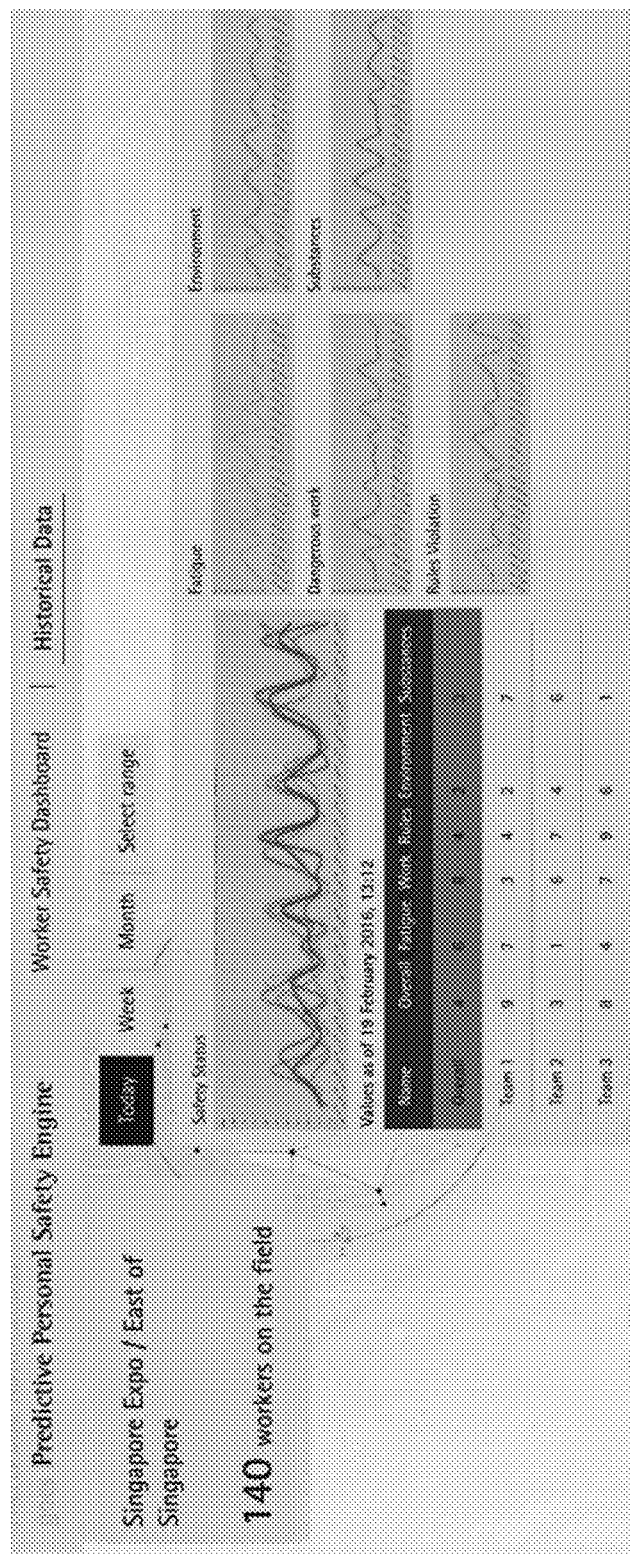
Figure 20:
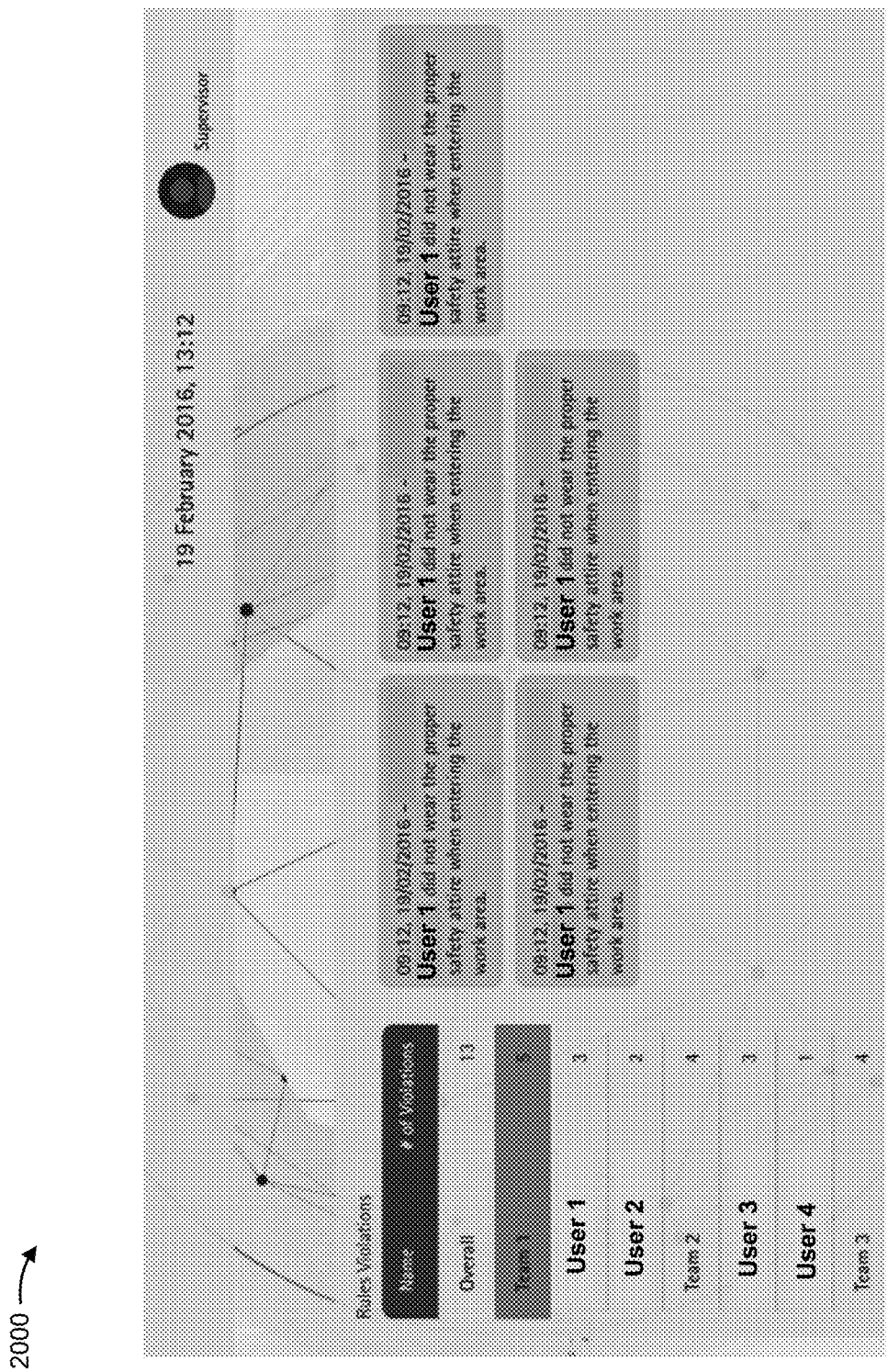

As shown in FIGS. 19-20, workplace device 270 may display a historical data section upon selection by a user. The historical data section may include statistics for workers or teams of workers. As shown in FIG. 19, workplace device 270 may display the historical data section to show one or more graphs of various factors. The graphs may be plotted over a day, a week, a month, and/or a time range selected by the user. For example, workplace device 270 may display a graph of an aggregate or average safety score for a selected team of workers. As another example, workplace device 270 may display a graph of an aggregate or average factor score over time for one or more factors. In this case, workplace device 270 may display multiple graphs on a same field, with the graph for each different factor shown in a different color.

As shown in FIG. 20, workplace device 270 may display the historical data section to show information such as rules violations, alerts, notifications, or the like for a selected worker, a selected team of workers, or all workers. For example, workplace device 270 may display all rules violations for a selected worker. In some implementations, workplace device 270 may display the information for a particular time period, such as a day, a week, a month, and/or a time period selected by the user.

In this way, safety analysis platform 240 may obtain and use environmental measurements, physiological measurements, and work information to generate a safety score. Further, safety analysis platform 240 may use the safety score to predict when workplace accidents are likely to occur, and may send alerts to prevent such accidents from occurring. As a result, worker injuries and fatalities may be prevented, property damage may be avoided, and downtime of workers and/or equipment may be reduced.

As indicated above, FIGS. 6-20 are provided merely as an example. Other examples are possible and may differ from what was described in connection with FIGS. 6-20.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
generating, by a system, a first safety score for a first worker based on at least one of:
one or more environmental measurements associated with a workplace, or
one or more physiological measurements associated with the first worker;
updating, by the system and based on the first safety score, a second safety score for a second worker; and
selectively causing, by the system and based on at least one of the first safety score or the second safety score, equipment to at least one of:
shut down,
reboot,
reduce throughput or operating speed,
reconfigure,
power off a particular area of the workplace,
populate one or more portions of a user interface,
turn on a camera, or
change focus of the camera.

2. The method of claim 1, further comprising:
obtaining work information associated with at least one of the first worker or the workplace; and
where generating the first safety score comprises:
generating the first safety score based on the work information.

3. The method of claim 1, where the one or more environmental measurements are received periodically.

4. The method of claim 1, where the one or more environmental measurements are received via one or more sensors.

5. The method of claim 1, where the one or more environmental measurements include one or more projections of a future environmental condition.

6. The method of claim 1, where the one or more physiological measurements are received via one or more sensors.

7. The method of claim 1, where the one or more physiological measurements include a measurement of a physiological indicator over time.

8. A device, comprising:
a memory; and
one or more processors to:
generate a first safety score for a first worker based on at least one of:
one or more environmental measurements associated with a workplace, or
one or more physiological measurements associated with the first worker;
update, based on the first safety score, a second safety score for a second worker; and
selectively cause, based on at least one of the first safety score or the second safety score, equipment to at least one of:
shut down,
reboot,
reduce throughput or operating speed,
reconfigure,
power off a particular area of the workplace,
populate one or more portions of a user interface,
turn on a camera, or
change focus of the camera.

9. The device of claim 8, where the one or more processors are further to:
apply a first weight to the one or more environmental measurements; and
apply a second weight to the one or more physiological measurements; and
where the one or more processors, when generating the first safety score, are to:
generate the first safety score based on the first weight and the second weight.

10. The device of claim 8, where the one or more processors, when generating the first safety score, are to:
generate the first safety score based on applying at least one of:
a model,
machine learning, or
artificial intelligence.

11. The device of claim 8, where the one or more processors are further to:
train a model based on at least one of an accident occurring or an incident being reported; and
where the one or more processors, when generating the first safety score, are to:
generate the first safety score based on applying the model.

12. The device of claim 8, where the one or more processors, when updating the second safety score, are to:
update the second safety score based on a location of the first worker and a location of the second worker.

13. The device of claim 8, where at least one of the first safety score or the second safety score indicates a predicted future risk level associated with the first worker or the second worker.

14. The device of claim 8, where the one or more processors are further to:
provide a recommendation to mitigate a risk level associated with at least one of the first safety score or the second safety score.

15. A non-transitory computer-readable medium storing instructions, the instructions comprising:
one or more instructions that, when executed by one or more processors of a device, cause the one or more processors to:
generate a first safety score for a first worker based on at least one of:
one or more environmental measurements associated with a workplace, or
one or more physiological measurements associated with the first worker;
generate, based on the first safety score, a second safety score for a second worker; and
selectively cause, based on at least one of the first safety score or the second safety score, equipment to at least one of:
shut down,
reboot, reduce throughput or operating speed,
reconfigure,
power off a particular area of the workplace,
populate one or more portions of a user interface,
turn on a camera, or
change focus of the camera.

16. The non-transitory computer-readable medium of claim 15, where the one or more instructions, when executed by the one or more processors, further cause the one or more processors to:
provide, based on at least one of the first safety score or the second safety score, an alert to one or more devices within a threshold proximity of at least one of the first worker or the second worker.

17. The non-transitory computer-readable medium of claim 16, where the alert causes the one or more devices to output a signal.

18. The non-transitory computer-readable medium of claim 15, where the one or more instructions, that cause the one or more processors to generate the second safety score, cause the one or more processors to:
generate the second safety score based on a proximity between the first worker and the second worker.

19. The non-transitory computer-readable medium of claim 15, where at least one of the first safety score or the second safety score indicates a current risk level associated with the first worker or the second worker.

20. The non-transitory computer-readable medium of claim 15, where the one or more instructions, that cause the one or more processors to generate the second safety score, cause the one or more processors to:
generate the second safety score based on the device not being in communication with a safety device.

* * * * *